(12) United States Patent
Ouimette et al.

(10) Patent No.: US 9,473,634 B1
(45) Date of Patent: *Oct. 18, 2016

(54) MANAGEMENT SYSTEM FOR USING SPEECH ANALYTICS TO ENHANCE CONTACT CENTER AGENT CONFORMANCE

(71) Applicant: Noble Systems Corporation, Atlanta, GA (US)

(72) Inventors: Jason P. Ouimette, Berkeley Lake, GA (US); Jennifer L. Blackwell, Woodstock, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,542

(22) Filed: Oct. 12, 2015

Related U.S. Application Data

(63) Continuation of application No. 13/949,467, filed on Jul. 24, 2013, now Pat. No. 9,225,833.

(51) Int. Cl.
*H04M 3/00* (2006.01)
*H04M 3/51* (2006.01)
*H04M 3/42* (2006.01)

(52) U.S. Cl.
CPC ....... *H04M 3/5175* (2013.01); *H04M 3/42221* (2013.01)

(58) Field of Classification Search
CPC ........... H04M 3/5232; H04M 3/5183; H04M 3/5175; H04M 3/5191; H04M 3/5233; H04M 3/5158; H04M 3/493; H04M 3/4936; H04M 3/5166; H04M 3/42221; H04M 2201/40

USPC ................. 379/88.01, 266.07, 265.01–266.1
See application file for complete search history.

(56) References Cited

U.S. PATENT DOCUMENTS

| | | | |
|---|---|---|---|
| 5,267,305 A | 11/1993 | Prohs et al. | |
| 5,270,920 A | 12/1993 | Pearse et al. | |
| 6,157,808 A | 12/2000 | Hollingsworth | |
| 6,356,634 B1 | 3/2002 | Noble, Jr. | |
| 6,862,343 B1 | 3/2005 | Vacek et al. | |
| 7,133,828 B2 | 11/2006 | Scarano et al. | |
| 7,542,902 B2 | 6/2009 | Scahill et al. | |
| 7,548,539 B2 | 6/2009 | Kouretas et al. | |

(Continued)

OTHER PUBLICATIONS

U.S. Appl. No. 61/7753,641, filed Dec. 31, 1899, Watson et al.

(Continued)

*Primary Examiner* — Rasha Al Aubaidi

(57) ABSTRACT

A call center compliance system is used to ensure that agents adhere to call center policies and applicable regulations when handling calls. A call handler processing a call between an agent and a remote party bridges on a speech analytics component. A keyword set is used by the speech analytics component to analyze the remote party's or the agent's speech. If a keyword is detected, an event notification is provided from the speech analytics component to the call handler. A logic script executing in the call handler defines what actions are to occur in response to receiving the event notification. The call handler can provide information to the agent, record a violation, or await further event notifications. In one embodiment, detection of a first keyword in a first keyword set spoken by a remote party causes the agent's speech to be monitored using a second keyword set.

20 Claims, 18 Drawing Sheets

(56) References Cited

U.S. PATENT DOCUMENTS

| | | |
|---|---|---|
| 7,574,000 B2 | 8/2009 | Blair |
| 7,672,845 B2 | 3/2010 | Beranek et al. |
| 7,752,043 B2 | 7/2010 | Watson |
| 7,930,179 B1 | 4/2011 | Gorin et al. |
| 7,974,411 B2 | 7/2011 | Krishnapuram et al. |
| 8,078,470 B2 | 12/2011 | Levanon |
| 8,094,790 B2 | 1/2012 | Conway et al. |
| 8,094,803 B2 | 1/2012 | Danson et al. |
| 8,155,297 B1 | 4/2012 | Dhir et al. |
| 8,175,007 B2 | 5/2012 | Jain et al. |
| 8,180,643 B1 | 5/2012 | Pettay et al. |
| 8,204,180 B1 | 6/2012 | Narayanan et al. |
| 8,209,182 B2 | 6/2012 | Narayanan |
| 8,219,401 B1 | 7/2012 | Pettay et al. |
| 8,249,875 B2 | 8/2012 | Levanon et al. |
| 8,275,115 B1 | 9/2012 | Everingham et al. |
| 8,396,205 B1 | 3/2013 | Lowry et al. |
| 8,396,732 B1 | 3/2013 | Nies et al. |
| 8,401,155 B1 | 3/2013 | Barnes et al. |
| 8,422,641 B2 | 4/2013 | Martin, II |
| 8,463,606 B2 | 6/2013 | Scott et al. |
| 8,504,371 B1 | 8/2013 | Vacek et al. |
| 8,531,501 B2 | 9/2013 | Portman et al. |
| 8,761,376 B2 | 6/2014 | Pande et al. |
| 8,767,948 B1 | 7/2014 | Riahi et al. |
| 8,781,092 B2 | 7/2014 | Noble, Jr. |
| 8,949,128 B2 | 2/2015 | Meyer et al. |
| 9,014,364 B1 | 4/2015 | Koster et al. |
| 2003/0002651 A1 | 1/2003 | Shires |
| 2003/0154120 A1 | 8/2003 | Freishtat et al. |
| 2004/0008828 A1 | 1/2004 | Coles et al. |
| 2004/0249650 A1 | 12/2004 | Freedman et al. |
| 2005/0226395 A1 | 10/2005 | Benco et al. |
| 2005/0238161 A1 | 10/2005 | Yacoub et al. |
| 2005/0286705 A1 | 12/2005 | Contolini et al. |
| 2005/0286706 A1 | 12/2005 | Fuller |
| 2006/0050658 A1 | 3/2006 | Shaffer et al. |
| 2006/0111953 A1 | 5/2006 | Setya |
| 2006/0233346 A1 | 10/2006 | McIlwaine et al. |
| 2006/0256954 A1 | 11/2006 | Patel et al. |
| 2006/0259473 A1 | 11/2006 | Li et al. |
| 2006/0262919 A1 | 11/2006 | Danson et al. |
| 2006/0265090 A1 | 11/2006 | Conway et al. |
| 2007/0088563 A1 | 4/2007 | Nardotti, Jr. et al. |
| 2007/0111180 A1 | 5/2007 | Sperle et al. |
| 2007/0160054 A1 | 7/2007 | Shaffer et al. |
| 2007/0280211 A1 | 12/2007 | Malueg et al. |
| 2007/0280460 A1 | 12/2007 | Harris et al. |
| 2008/0002823 A1 | 1/2008 | Fama et al. |
| 2008/0027785 A1 | 1/2008 | Mechaley et al. |
| 2008/0037719 A1 | 2/2008 | Doren |
| 2008/0082330 A1 | 4/2008 | Blair |
| 2008/0240376 A1 | 10/2008 | Conway et al. |
| 2008/0270123 A1 | 10/2008 | Levanon et al. |
| 2009/0157449 A1 | 6/2009 | Itani et al. |
| 2009/0295536 A1 | 12/2009 | Doren |
| 2010/0036670 A1 | 2/2010 | Hill et al. |
| 2010/0082342 A1 | 4/2010 | Erhart et al. |
| 2010/0104086 A1 | 4/2010 | Park |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0033036 A1 | 2/2011 | Edwards et al. |
| 2011/0125499 A1 | 5/2011 | Griggs et al. |
| 2011/0145093 A1 | 6/2011 | Paradise et al. |
| 2011/0202344 A1 | 8/2011 | Meyer et al. |
| 2011/0218798 A1 | 9/2011 | Gavalda |
| 2011/0228919 A1 | 9/2011 | Tew et al. |
| 2011/0287748 A1 | 11/2011 | Angel et al. |
| 2011/0307258 A1 | 12/2011 | Liberman et al. |
| 2011/0317828 A1 | 12/2011 | Corfield |
| 2012/0045043 A1 | 2/2012 | Timpson |
| 2012/0140911 A1 | 6/2012 | Johansen et al. |
| 2012/0263285 A1 | 10/2012 | Rajakumar et al. |
| 2013/0003943 A1 | 1/2013 | Munns et al. |
| 2013/0129069 A1 | 5/2013 | Peterson |
| 2013/0246053 A1 | 9/2013 | Scott et al. |
| 2014/0100848 A1 | 4/2014 | Shaffer et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0241519 A1 | 8/2014 | Watson et al. |
| 2014/0257820 A1 | 9/2014 | Laperdon et al. |
| 2014/0379525 A1 | 12/2014 | Timem et al. |
| 2015/0106091 A1 | 4/2015 | Wetjen et al. |
| 2015/0281446 A1 | 10/2015 | Milstein et al. |

OTHER PUBLICATIONS

Office Action Received for U.S. Appl. No. 14/230,463 dated Oct. 1, 2015.

Office Action Received for U.S. Appl. No. 14/661,676 dated Sep. 21, 2015.

Office Action Received for U.S. Appl. No. 14/445,501 dated Nov. 24, 2015.

Office Action Received for U.S. Appl. No. 13/968,692 dated Nov. 30, 2015.

Office Action Received for U.S. Appl. No. 14/875,130 dated Dec. 1, 2015.

Notice of Allowance Received for U.S. Appl. No. 14/661,676 dated Nov. 20, 2015.

Office Action Received for U.S. Appl. No. 14/230,463 dated Mar. 30, 2016.

Office Action Received for U.S. Appl. No. 14/172,993 dated Dec. 18, 2015.

Notice of Allowance Received for U.S. Appl. No. 14/445,501 dated Feb. 4, 2016.

Office Action Received for U.S. Appl. No. 14/073,083 dated Feb. 16, 2016.

Notice of Allowance Received for U.S. Appl. No. 14/875,130 dated Feb. 24, 2016.

Dffice Action Received for U.S. Appl. No. 14/080,912 dated Apr. 8, 2016.

Dffice Action Received for U.S. Appl. No. 14/743,200 dated Apr. 7, 2016.

Notice of Allowance Received for U.S. Appl. No. 14/186,404 dated Sep. 1, 2015.

Office Action Received for U.S. Appl. No. 14/230,463 dated Jan. 14, 2016.

Notice of Allowance Received for U.S. Appl. No. 14/073,083 dated May 25, 2016.

MANAGEMENT SYSTEM FOR USING SPEECH ANALYTICS TO ENHANCE CONTACT CENTER AGENT CONFORMANCE

CROSS REFERENCE TO RELATED APPLICATIONS

This application is a continuation of U.S. patent application Ser. No. 13/949,467, filed on Jul. 24, 2013, now U.S. Pat. No. 9,225,833 the contents of which are incorporated by reference for all that it teaches.

FIELD OF THE DISCLOSURE

The concepts and technologies disclosed herein generally pertain to using a speech analytics component for enhancing contact center agent compliance with contact center policies and/or regulations, such as those governing debt collection calls. A framework is provided allowing customization of a call handler component for responding to various detected contexts based on analyzing speech between an agent and a remote party in order to facilitate agent compliance with contact center policies and/or regulations.

BACKGROUND OF THE INVENTION

Various government regulations may govern how calls are handled in a contact center. Some of these regulations may regulate what can be said, or what must said, during a call. For example, in some instances regulations may require informing the called party of certain aspects as to the purpose of the call. In other instances, certain agent behaviors may be prohibited or discouraged. For example, with respect to debt collection calls involving collection of debts owed by an individual, aspects of the call may be regulated by the Fair Debt Collection Practices Act ("FDCP"). This regulation prohibits agents from certain practices, such as using profane or intimidating language. Such statutes may also prohibit debt collectors from attempting to collect a debt from individuals who have declared bankruptcy. If a debt collector calls a debtor who just filed for bankruptcy or is about to file for bankruptcy, then the agent should cease attempts to collect the debt upon being informed of this. Further, many contact center operators will instruct their agents to then limit their responses to certain inquiries.

In addition, contact centers may have internal policies governing what agents may or may not do under certain conditions. Agents may not be fully trained or experienced to handle all contexts arising in a call, and it is possible that adherence to internal policies are not always followed by agents. Agent training is one approach for minimizing such non-compliant actions, but identifying agents requiring training can be laborious. Recoding the agent's call and reviewing these may serve as one way for identifying agents requiring further training. This allows the agent and their supervisor to review how the agent conducted the call and improve any identified deficiencies. However, this approach does not ensure that agents comply with policies and regulations in real-time, and is merely proscriptive. Further, recording and reviewing only occurs for a fraction of the agent's calls, and a non-complying agent may not always be immediately detected. In some instances, an agent's non-compliance with a regulation can result in a fine to the contact center. Consequently, technologies are required to provide real-time compliance solutions.

Further, speech analytics has matured to the point where such systems can accurately and practically detect specific contexts in a conversation. While some limited applications have been devised for using speech analytics in a contact center to assist agents with information required to handle a current call, no general framework has been defined allowing contact centers to configure systems in a flexible manner to detect and act upon non-compliant agents in real time. It is with these aspects in mind that the concepts and technologies herein are disclosed.

SUMMARY

Various embodiments are disclosed for providing compliance enforcement in a contact center. In various embodiments, a speech analytics component monitors a remote party's speech. Based on analyzing certain words or phrases, the speech analytics component informs a call handler, which determines whether certain regulations or policies are applicable. The system may provide to the agent visual text information or icons for commanding pre-recorded audio announcement to be played to facilitate the agent's compliance. The agent may respond by indicating a particular pre-recorded announcement should be played, which provides an appropriate response under the conditions encountered. Failure of the agent to play the prompt or respond in a prescribed manner may result in reporting a violation, such as to an administrator.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
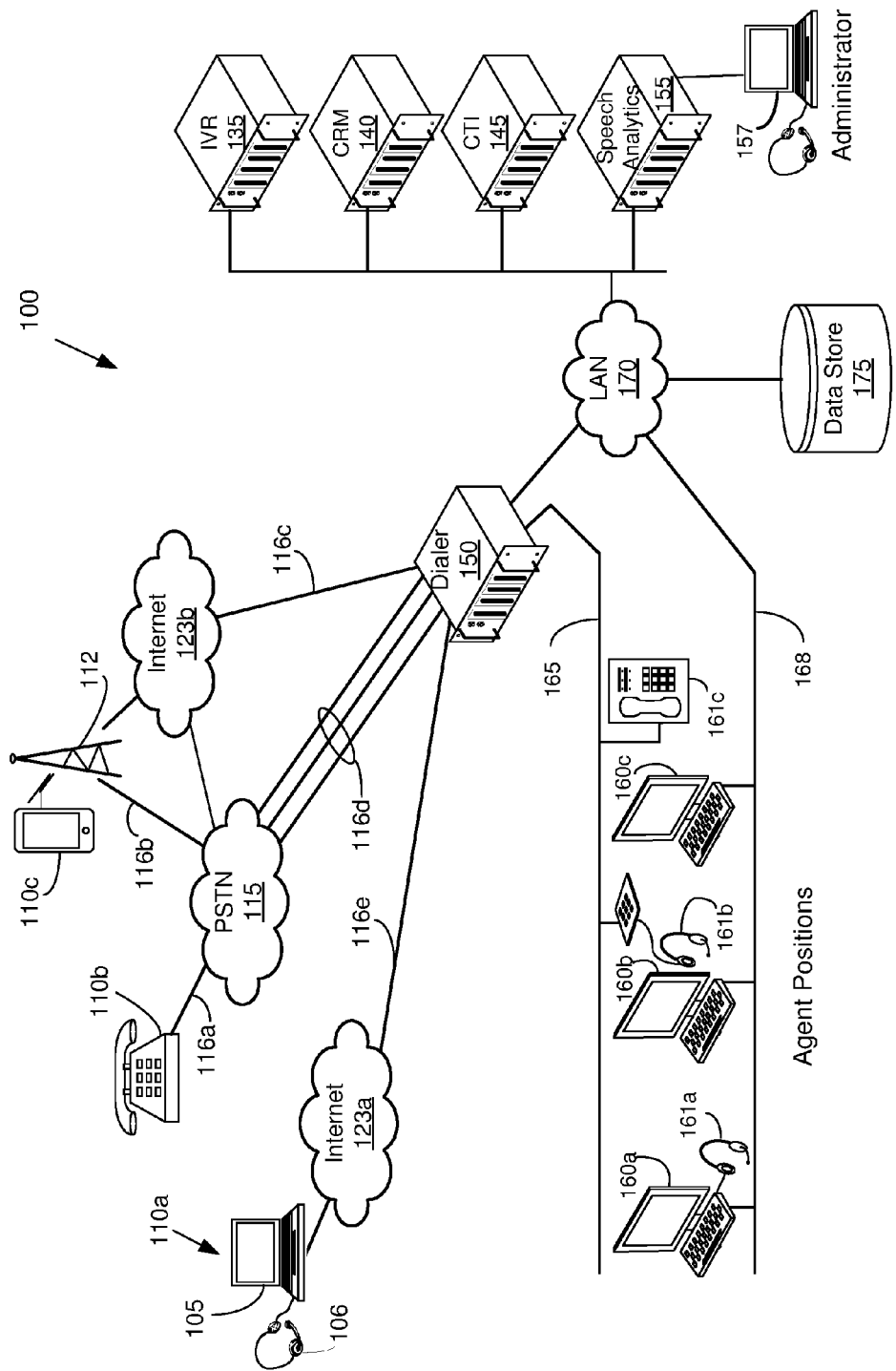
FIG. 1 illustrates one embodiment of a call center architecture for providing compliance enforcement when an agent originates a call to a remote party.

Compliance enforcement may broadly refer to how calls are established or handled by a contact center in certain contexts. In some instances, compliance enforcement involves ensuring calls are establishing within certain calling windows, avoiding calling wireless numbers using certain equipment, or calling numbers associated with a do-not-call list. Many contact centers use computerized equipment, such as dialers, to originate calls so as to avoid such compliance violations. Rather, the compliance issues addressed herein do not deal so much with how, when, or why the call is established, but what is said between the agent and the remote party after the call is established, i.e., the "context". Reference to "context" means a situation as defined by the content spoken between an agent and a remote party. Thus, the compliance issues addressed herein largely involve what is said between the parties, and pertain to after a connection is established (and not how the call was established). These context related compliance issues may equally apply to either outgoing or incoming calls relative to the contact center.

Ensuring contact center agents comply with applicable regulations and policies can be difficult. Detection of an agent's failure to conform to applicable regulations has largely been after-the-fact and because this involves what is said between the agent and the remote party, detection has been conventionally accomplished by reviewing recordings of the agent's calls. Analyzing an agent's past call recordings can also serve as a training aid to impact how to handle future calls. Agent training can be used to inform and educate the agent about proper call handling procedures in a variety of contexts. However, agent training is largely targeted to facilitate compliance for future calls and still leaves the possibility that an agent will not conform to policies and regulations on a particular call. Obviously, analyzing agent recordings does not provide a real-time detection of agent non-compliance. However, it is desirable to detect agent compliance for every call in real time, and this remains difficult using conventional means. In some situations, agent non-compliance with certain call handling procedures can result in large fines and legal action. Thus, detecting and addressing non-compliance in real-time is very desirable from the perspective of the call center operator.

Some tools can facilitate agent compliance to regulations in real-time when handling a call. These aids include on-line procedural manuals and other automated tools to provide information that may be useful to the agent. A relatively new tool involves speech analytics that may be incorporated for real-time agent assistance. This tool can monitor the agent's speech in real-time and determine the existence of certain words or phrases and present the appropriate on-line manuals to the agent. While such tools may have some value, without a general framework allowing contact center operators to configure such systems uniquely for their operations, the utility of such technology is largely limited and do not serve well for ensuring agent compliance with regulations.

Exemplary Call Center Architecture

FIG. 1 shows one embodiment of a call center architecture 100 illustrating some of the various technologies disclosed herein. The call center shown in FIG. 1 may process voice calls that are inbound-only, outbound-only, or a combination of both (sometimes referred to as a "blended" call center). Although many aspects of call center operation are illustrated herein using outbound voice calls, in various embodiments, the call center may process inbound calls, or other forms of communication such as, for example, facsimiles, emails, text messages, video calls, and chat messages. That is, the call center may be considered a contact center. However, for the purposes of this disclosure, the term "call center" is used throughout, although it is understood that the two terms are synonymous.

Since the call center may process calls originating from a calling party, or initiated to a called party, the term "party," or "individual", without any further qualification, refers to a person associated with a call processed by the call center, where the call is either received from, or placed to, the party. Because the term "party" can also refer to either the agent or the calling/called party, the term "remote party" used herein refers to either the calling or the called party, but not the agent. Although the architecture may illustrate the call center originating outbound calls, the concepts disclosed here are not limited to only outbound calls or voice calls of a certain technology, unless the context dictates such.

Depending on the embodiment, voice calls may originate or terminate to remote parties using a variety of different phone types. For instance, a remote party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Voice calls may also originate from (or terminate to) a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Voice calls may also involve a remote party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, a conventional telephone 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between two points. A call may comprise a number of concatenated call legs, as known to those skilled in the art, or the call legs may be joined to form a conference call.

In various embodiments, calls in the contact center are handled by a call handler. This refers to equipment that may process either incoming or outgoing calls. One form of a call handler is an automatic call distributor ("ACD") (not shown in FIG. 1, but would replace the dialer 150 as shown) for receiving incoming calls. In particular embodiments, the ACD may be a specialized switch for receiving and routing inbound calls under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call over call center facilities 165 to an available agent.

Another form of a call handler is a dialer 150 that originates calls. In various embodiments, outbound calls may originate by a dialer 150 over facilities 116c, 116d, or 116e to the remote parties. The dialer 150 may further establish a call leg to an available agent using facilities 165, or in some instances 168, depending on the technologies and embodiments. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD.

The physical area at which the agent works is often referred to as an agent "position" and these positions are often grouped into clusters that are managed by a supervisor, who may monitor calls and the agents' productivity. An agent typically uses a computing device 160a-160c, such as a computer, and a voice device 161a-161c. The combination of computing device 160a-160c and/or voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. Displaying data at the agent's workstation means displaying data at the computer at the agent's workstation.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call handler to know which agents are available for handling calls. In particular embodiments, the call handler may also maintain data of an agent's skill level that may be used to route a specific call to the agent or group of agents having the same skill level. In particular instances, if a suitable agent is not available to handle a call, the call handler may queue the call for the next available agent. As can be expected, various algorithms may be employed to process calls in an efficient manner.

In various embodiments, a CTI server 145 may be incorporated in the call center architecture 100 to control, monitor, and/or coordinate other components of the architecture 100. Specifically, the CTI server 145 may interact with other components to coordinate call processing. Thus, in particular embodiments, the CTI server 145 may control routing of calls from the call handler to the various agent workstations and/or may provide data to other components processing the calls. In addition, in particular embodiments, the CTI server 145 may also monitor various components of the architecture 100. For example, the CTI server 145 may monitor the number of calls received and/or made by the call center and/or monitor performance parameters of agents such as the average handling time of calls for individual agents. Further, the CTI server 145 may also provide call reporting functionality based on data collected during calls.

In various embodiments, an interactive voice response system ("IVR") 135 may be used to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the remote party to enter account information or otherwise obtain information used to service the call. Further, in particular embodiments, the IVR 135 may interact with other components, such as the CTI server 145 or a data store 175, to retrieve or provide information for processing the call. In other configurations, the IVR 135 may be used to only provide announcements.

Depending on the embodiment, the interaction between the call handler (e.g., dialer 150), IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a remote party, the agent may use her workstation computer 160a-160c to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications used by the agent to service the call.

In various embodiments, the dialer 150 (or other form of call handler) may also interact with a speech analytics component 155. The interaction may involve establishing a call leg of a call between the remote party and an agent, so that the speech analytics component 155 is able to analyze the speech in real time. This may involve a set of dedicated trunks between the dialer 150 and the speech analytics component, or a data connection, suitable for conveying voice over IP, which can be conveyed using LAN 170. Further, signaling information may be exchange between the dialer 150 and the speech analytics component 155 as necessary. The speech analytics component 155 may provide indications to the dialer 150 (or call handler, if other types of call handling equipment are involved), that indicate certain words were spoken by one of the parties on the call, e.g., either the agent or the remote party. These indications may be also referred to as "events" or "event notifications" herein. Technically, the detection of a keyword is an "event" and the notification of the event is an "event notification." However, as it will be seen, both of these may be broadly referred to as an "event."

An administrator's computer 157 may interface to the speech analytics component 155 that allows a call center administrator to define which keywords are to be used, the logic as to how the keyword sets are to be used, and what should be done when event notifications are received by the call handler. More about these capabilities will follow.

Although a number of the above components may be referred to as a "server," each may be also referred to in the art as a "computing device," "unit" or "system." For example, the speech analytics component may be a stand-alone system (a.k.a. speech analytics system). A component may incorporate a local data store and/or interface with an external data store. Use of the word "server" does not require that the component interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the dialer 150, IVR 135, CRM server 140, CTI server 145, and speech analytics component 155, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the components identified above actually be located or controlled by a call center operator.

In addition, depending on the embodiment, the agent positions may be co-located in a single physical call center or multiple physical call centers. The agents may be remotely located from the other components of the call center, and may also be remotely located from each other, an arrangement sometimes referred to as a "virtual call center."

In particular instances, the virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

Use of Speech Analytics for Agent Compliance

Speech analytic tools can be used to enforce real-time agent compliance with call center policies by monitoring the speech of both the agent and the remote party during the conversation. In many instances, it is not sufficient to merely monitor the combined speech, without knowledge of which speech corresponds to the remote party and which speech corresponds to the agent. Compliance usually requires knowing sufficient details of the context to identify which party spoke what information, and how the other party responded. In a very simple example, monitoring a call to ensure that the agent does not utter profanities requires knowing which speech is associated with the agent. It is not unusual for angry remote parties to utter a profanity, and the agent should not be tagged as being responsible.

As evident from the above example, compliance may also involve, in some instances, monitoring only the agent's speech. There may be certain words or phrases that the agent should never state, but in practice, these may be relatively rare, since absolute bars to stating certain words or phrases may be easily taken out of context. For example, suppose the agent is never to say the phrase "give it to you for free" because they are not to give away products or services. However, the agent may repeat such a phrase when confirming a question from the caller by saying, "If I understand you correct, you want us to give it to you for free, which we cannot do." Under a strict interpretation, a violation may be detected by that agent, when in practice no violation was actually committed by the agent. However, there may be times when the agent should never utter certain words during a call, such as profanity.

In many instances, agent compliance involves the agent responding in a certain manner to information provided by the party. The agent may be required to respond in a certain manner after being informed by the individual of certain facts or allegations. Thus, many compliance situations involve how the agent reacts to information provided by the party.

The detection of a word or phrase is reported by the speech analytics component to the call handler via a message referred to herein as an "event" or "event notification." The event may signify detection of a particular word or phrase as defined by criteria specified by an administrator. In many other instances, a flexible format may allow defining criteria so that an event may report a variety of conditions associated with one or more words. For instance, returning to the example where the agent is never to say the phrase "give it to you for free," specifying criteria may not cover instances, such as when the agent says "give the item to you for free", or "give that to you for free." Rather than define all the possible phrases, the criteria may be defined as whenever the word "give" is used within six words of the word "free" by the agent. Alternatively, criterion could be to report an event whenever "give" or "have" is used by the agent within five words of "free" or "no-charge." Those skilled in the art will recognize that various formats can be defined to specify the phrase to be detected. Such flexibility makes it easier to define the criteria used by the speech analytics component to detect a particular situation in a conversation.

For example, an agent inquiring about the type of vehicle a caller needs to be serviced may expect to hear one of several individual words, such as "car", "automobile", "sedan", "convertible", "truck", etc. However, in certain contexts, phrases may be used, such as "sport utility vehicle." The word "sport" by itself is not very useful, but when used in the proximity of "utility" and "vehicle", the phrase becomes indicative of the type of vehicle. Thus, combinations of words used as a phrase can also be a define phrase.

Once the call handler receives the event notification, various actions may occur. This may involve presenting information to the agent, as well as presenting an option to play pre-recorded scripts. In many instances, a script may be pre-recorded in the agent's voice, so that when the agent approves the script to be played, the called party will not be able to readily discern that a recording is being played, as opposed to the agent is speaking live. The pre-recorded script can be written to confirm with applicable policies. Thus, integration of speech analytics and pre-recorded scripts can ensure that an agent is conforming to applicable policies and regulations. Many other possible actions can be taken, as will be seen.

Service Example

An example is presented herein for illustrating aspects of the invention including how a call handler can react upon receiving an event from a speech analytics component reporting detection of certain words. This example is based on a debt-collection context. More specifically, the example involves an agent contacting an individual in relation to collecting a debt owed by the individual. Hence, the call handler is a dialer and the call is an outbound call. Upon being called and discussing the debt with the agent, the individual may inform the agent that they are about to file for bankruptcy, or have just filed for bankruptcy. In such situations, the agent, acting to collect the debt, should proceed in a certain manner. Preferably, the agent should obtain information of the individual's attorney and contact information, if possible. Further, if the bankruptcy case has been already filed, the agent should ask for the court's case number. At this point, regulations or policies may require that the agent cease any attempts to collect the debt and cease making any related inquiries regarding the status or repayment of the debt or specifics pertaining to the individual's bankruptcy.

This example is used to illustrate how detecting keywords by the individual and the agent can be used to determine if the agent is in compliance with applicable policies. The invention is not limited to only compliance enforcement in a debt-collection context, but can be applied to other contexts, such as when soliciting donations, telemarketing sales, etc. Additional examples are provided later on to illustrate other applications and to illustrate the breadth and scope of the invention.

The speech analytics component can monitor and analyze the called party's speech for the presence of words or phrases. It can also determine whether certain words occur frequently or within the vicinity of other words. For simplicity, reference to "keyword" will be used herein (as opposed to "word and/or phrase(s)"), and it should be understood that reference to "keyword" also encompasses a single word, phrase, or certain words used within the vicinity of each other as well, unless the context dictates otherwise. A relatively short list of phrases will suffice for accurately detecting this situation. For example, for this embodiment, a set of keywords associated with the remote party may include: "bankrupt", "bankruptcy", "attorney", "lawyer", "filing for bankruptcy", "chapter 7", or "bankruptcy court." The set of keywords is referred to as the "keyword set." There is a high probability that a called party informing the agent of a change in their financial status would use one of the words in the keyword set. If additional phrases or words are discovered, these can be added to the keyword set. The keyword set can also define when certain words are used in close relationship. For example, a remote party who has filed for bankruptcy may use the word "file" in close relationship with the word "bankruptcy." Detecting words in close association with each other increases the likelihood of correctly assessing the context of the conversation.

It further becomes evident from this example that the keyword set must be associated with the remote party. That is, the keyword set is used when analyzing the speech of the remote party, not the agent. In other cases, another keyword set is defined that is associated with the agent. This may be a different keyword set, or the same. Typically, the keywords in the set overlap to an extent, but are not the same. To facilitate identification, the keyword sets may be named. For example, the keyword set containing the various words related to bankruptcy as reported by the remote party may be labeled the "bankruptcy keyword set." Other naming conventions may include a reference to which party the keyword set is associated with. Thus, the above keyword set could also be referred to as the "remote party: bankruptcy keyword set."

An event notification reporting detection of a keyword in a keyword set may simply indicate a match has occurred, or may indicate a probability of a match. In many embodiments disclosed herein, the event notification reports that a match has occurred, and there is a presumption that there is a high level of confidence by the speech recognition component that the match occurred. Based on various embodiments, a probability or weighting indication may be provided that indicates the 'strength' of the match.

Once the speech analytics component determines that the called party in a debt collection call context has used one of the keywords in the bankruptcy keyword set, appropriate alerts can be provided to the agent on their computer. The alerts may provide text indicating to the agent that they should, e.g., ask for the name of the individual's lawyer and confirm whether bankruptcy has already been filed. If so, then the court's case number should be obtained. The text may further indicate to the agent that no further attempts to collect should occur during the call.

The actions that occur upon detection of a keyword in the bankruptcy keyword set may trigger other actions by the call handler. For example, in addition to presenting text informing the agent of the preferred course of conduct, an option may be presented for the agent to select and play a pre-recorded announcement to the called party. In one embodiment, the announcement is recorded in the agent's voice and the content has been pre-cleared to ensure that the announcement conforms to the appropriate call center policies.

In certain situations, the detection of a keyword by the called party may be in error. For example, the called party may have stated they "were not considering bankruptcy," and instead, the speech analytics system properly detected the word "bankruptcy." In such situations, the agent may disregard the suggestions provided on their workstation and elect to ignore any pre-recorded announcements offered. Instead, options may be presented allowing the agent to indicate to the call handler that these suggestions are not applicable (e.g., the detection of bankruptcy was in error). This allows the agent to override the system's operation in cases where an incorrect determination occurred.

In one embodiment, the agent may choose whether to respond to the called party's indication of bankruptcy by using a pre-recorded script or by speaking live to the called party. If the speech analytics component was correct in determining that the called party has entered into bankruptcy, then the speech analytics component may monitor the agent's speech to ensure that compliance with regulations is followed by the agent asking the called party what attorney is handling the case. If the pre-recorded script is used, then there should not be any question as to whether compliance with the regulations occurs. However, if the agent proceeds with a live dialogue, the agent may or may not comply with the policy.

For example, after the called party has indicated they have filed bankruptcy, the speech analytics system may monitor the agent's speech for a corresponding set of keywords or phrases, such as e.g., "name", "lawyer", "law firm", "counsel", "attorney", "case number", or "court." If the agent follows the procedures by asking for the name of the attorney handling the bankruptcy, there is a high probability that one of these words will be used.

Thus, a second keyword set may be defined for the agent, which can be referred to as the "lawyer-inquiry" keyword set. This keyword set is used or applied to the agent's speech only after the called party is determined to have entered bankruptcy. Thus, application of this second keyword set is dependent on keywords being detected in the first keyword set. Thus, the agent's use of a keyword in the second keyword set should not result in an event reported by the speech analytics component if the called party did not previously indicate they were filing for bankruptcy.

It would be possible to apply the "lawyer-inquiry" keyword set to the agent's speech at all times, and provide the event notification whenever such keywords are detected, but the only time that the event notifications would be relevant in this case is if a keyword was previously detected from the "bankruptcy" keyword set.

Assuming that the agent uses one of these keywords in the "lawyer-inquiry" keyword set, it is likely that that the agent has complied with the policy requiring that they ask the name of the law firm or attorney handling the bankruptcy. If the agent does not use one of these words, the speech analytics component may issue a second event notification, resulting in a warning/reminder text presented to the agent, and wait for the presence of such words in the agent's next response. If these words are not detected by the agent within a certain time frame, then a violation of the policy or regulation may be noted and/or transmitted to a supervisor, or other actions taken. Because violations may be levied against a call center for each occurrence of a violation, having tools that allow real-time detection offer the possibility of minimizing such occurrences, and any associated liability.

Figure 2A:
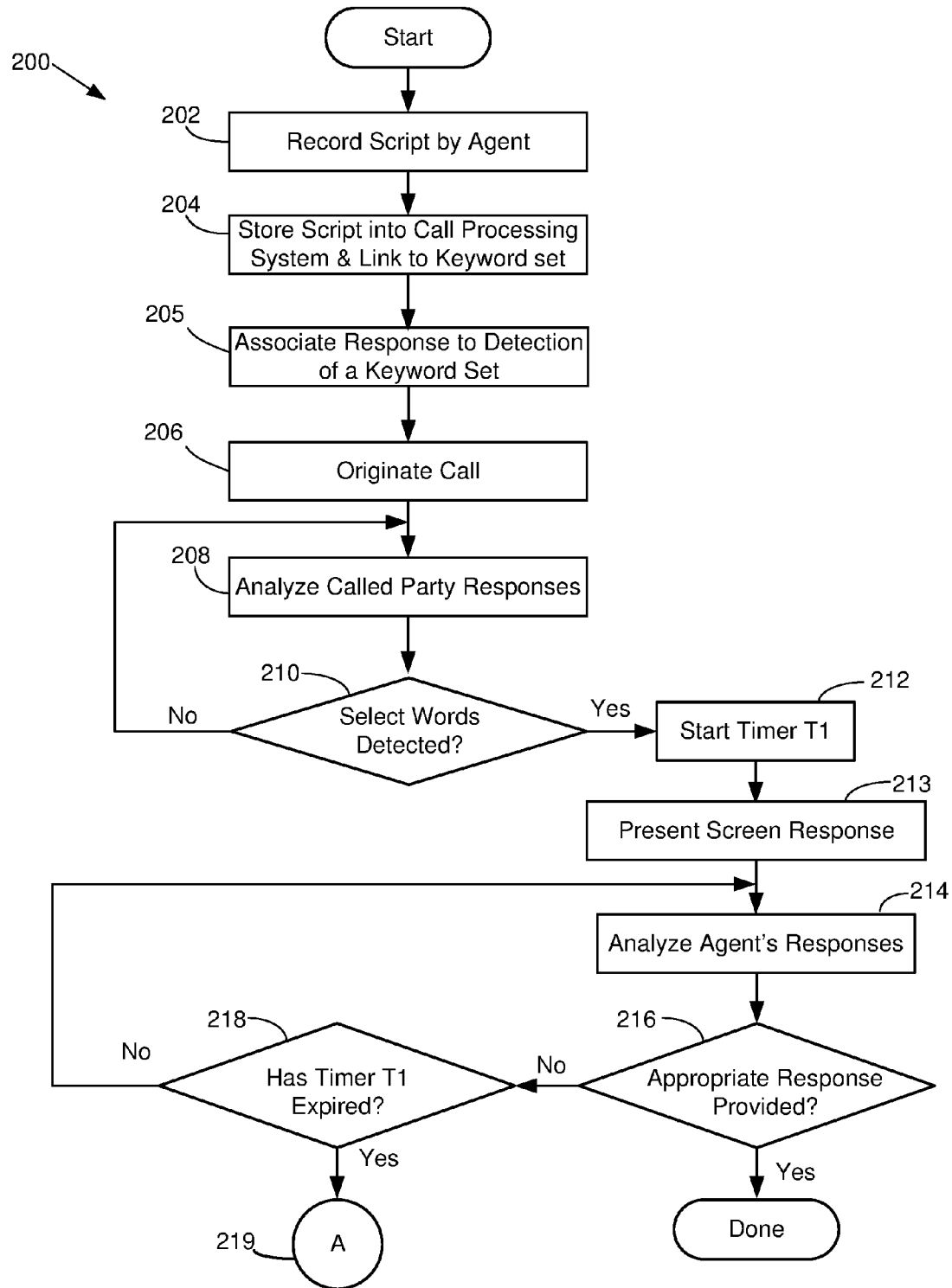
FIGS. 2A and 2B illustrate one process flow of an agent complying with a requirement in a contact center pertaining to debt collection calls when interacting with a called party.
Figure 2B:
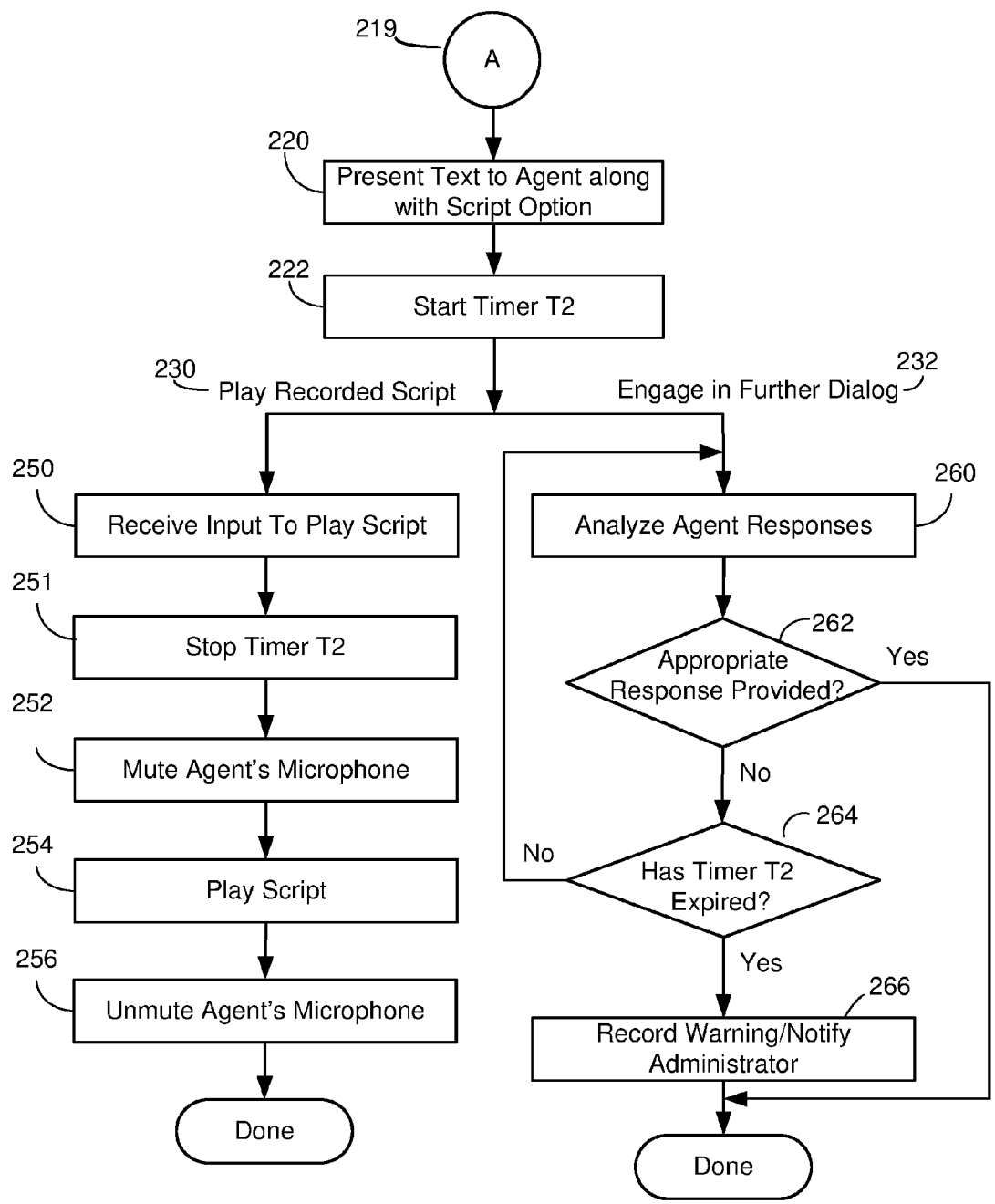

A more detailed description of one embodiment of this process flow is shown in FIGS. 2A and 2B. Turning to FIG. 2A, the process 200 begins with the agent recording a script in operation 202. This is the script that the agent may select to have played to the called party under specific situations. Preferably, the agent records the script in a voice that is typical of their normal voice. This minimizes the likelihood that the called party will be able to distinguish when the agent is talking live from when a pre-recorded script is being played. The agent may record a number of scripts, each which represents a different response to a commonly occurring situation. This step may involve using speech recording editing systems that allow the user to record, playback, and edit the recording.

The system also allows the recorded script to be linked to detection of a keyword set in operation 204. The keyword set may be defined by a name (e.g., "bankruptcy") and associated with the agent or the called party. This list may be refined over time, but represents the set of phrases along with associated requirements, which when detected, indicates a certain context has been detected in the conversation. Obviously, the set of words is dependent on the context to be detected.

Once the script has been recorded, stored, and linked to a context, a set of actions is defined that is appropriate for the context. The actions may include responses that may be taken by the call handler when the select words in the keyword set are detected. As described above, one response may comprise an action displaying text on the agent's terminal informing the agent of the relevant policy. Another action may be to display text of a script that the agent should read to the called party. Another action may display an icon for playing a recommended pre-recorded script to the called party. Other actions may not necessarily involve informing the agent via text information presented on the display, but may involve recording a data reflecting the detection of a keyword in a keyword set, sending a notification to a supervisor that certain information has not been provided by the agent, or recording a portion of the conversation that reflects the detected context, e.g., the situation that is associated with the detection of the select words by the remote party and the absence of a suitable response from the agent. An unsuitable agent response may involve failing to convey certain information to the called party or inquiring whether the remote party has actually filed for bankruptcy.

Thus, the steps illustrated in operations 204 and 205 involve defining in advance of any call what the keyword sets are, which party the keywords sets are associated with, the logic defining what happens when a keyword is detected and by whom, and defining the actions that may be triggered, such as playing any recordings that may be played, etc. Further details will be discussed as to further steps and procedures involved with these aspects.

Once this operating context is defined the system is ready to process calls. The next operation shown in FIG. 2A is originating a call to the called party in operation 206. Although the process flow is illustrated using an outbound call, the concepts and technologies herein can be applied to inbound calls as well. Recall that the example used to illustrate the concepts and technologies is a debt collection scenario, and typically calls are made by the contact center to called parties that are the individuals with the debt. That is, in this example, the individuals are being calls, and they are not calling into the contact center.

Once the call is originated to the remote party, the audio data of the conversation is copied to the speech analytics component, so that the speech content can be analyzed in operation 208. This can occur using a conference bridge or similar technology. Since the speech analytics component only needs to receive audio and does not provide audio, a modified bridging capability can be used as well.

Typically, on a debt-collection call, there may be a short exchange between the agent and the called party exchanging introductory comments, along with a statement from the agent indicating the purpose of the call. In one embodiment, the called party's words are continuously examined for the presence of the selected words or phrases in the "bankruptcy" keyword set in operation 210. In other embodiments, a timer may be associated with detecting a particular word from a keyword set. For example, if the called party is going to indicate that they have filed bankruptcy, they likely will state this after learning of the purpose of the call. That is, a keyword from the "bankruptcy" keyword set will likely be mentioned within the first few minutes of the call as opposed to sometime later. In any case, in operations 210 and 208 the called party's speech is continuously analyzed until one of the keywords are identified.

Once one of the selected words is identified in operation 210, a timer T1 may be started in operation 212. This timer is used to determine if the agent complies with applicable regulations by responding properly within a typical time period. The agent should not attempt to collect the debt, but should inquire immediately of the individual's attorney handling their bankruptcy case. In addition, after detecting a keyword by the called party, a screen response may be presented to the agent in operation 213. A screen response is visual information provided to the agent's computer screen when a keyword is detected. The screen response could comprise text informing the agent of the proper action or policy for handling the situation, an appropriate link to a policy manual, a script that can be read, or presenting an icon for playing a pre-defined script recorded in the agent's voice. Other indications could be provided by the screen response, and other actions can be taken aside from, or in addition to, providing a screen response.

The speech from the agent that includes the agent's response after hearing the called party state the select words is then analyzed in operation 214. The speech analytics component may apply a second keyword set to determine if the agent is responding appropriately. Thus, a test is made in operation 216 to determine if the agent's response is appropriate (e.g., has the agent used a word from the "lawyer-inquiry" keyword set). For example, the agent may have responded by acknowledging the called party has filed for bankruptcy and asks for their lawyer's name and contact information. If the determination in operation 216 is that the agent has properly responded, then the process is completed. In effect, the process identified a situation that required a specific response by the agent, and it was determined that the agent did respond appropriately.

Although FIG. 2A shows that the process has completed, in other embodiments, information may be written to a file indicating the context that was encountered and noting that the agent appropriately handled it. In other embodiments, the system may record an indicator every time an agent follows the policy in a specific situation (e.g., accumulate a point for the agent or increment a counter of some sort). There may be multiple opportunities for determining whether the agent has properly responded in a situation during a call. The accumulation of points may be used to evaluate the agent's performance, award compensation, schedule agents in a preferred manner, or award prizes. Indications may be presented to the agent regarding the agent's cumulative performance with respect to compliance, as well as information on the current call. Further, instances of exemplary agent responses can be recorded and identified for use as a training guide for other agents.

If, however, in operation 216, the agent has not provided a suitable response, the process continues to operation 218 where a test is made as to whether timer T1 has expired. It becomes evident that in many contexts determining whether the agent has responded appropriately typically involves using a timer. That is, if the agent is informed by the remote party that they have filed for bankruptcy, the agent should respond by inquiring about the party's lawyer or case number within a certain time limit. The particular values of these times are dependent on each particular context, and are typically set using the experience of the contact center operator.

For instance, in this example, when the remote party informs the agent that they have filed for bankruptcy, the agent should not attempt to collect the debt, but should obtain their lawyer's name and/or the case file number. In most situations, this response should be provided in a timely manner by the agent in response to learning of the individual's bankruptcy. Consequently, the timer may be set in a range, e.g. 15-30 seconds. It could be less or slightly more, but typically it would not be in, e.g., the 3-5 minute range. In other embodiments, the timer T1 may be started upon the agent's response, as opposed to detecting when the keyword spoken by the individual. This accommodates individuals that inform the agent of their bankruptcy, and continue to talk for some while, possibly running out the value of T1 before the agent has an opportunity to response. In other applications of the concepts and technologies herein for other situations, the agent may be expected to respond to information provided by the individual sometime during the call. In these other applications, the timer may be in the 3-5 minute range, or may be open ended (e.g., for the duration of the call).

If the timer T1 has not expired in operation 218, then the process continues to operation 214, which continues to analyze the agent's response. Thus, operations 214-218 check to see if the agent responds appropriately within a certain time period. If not, then the process continues at Label A 219, which continues on to FIG. 2B.

Turning to FIG. 2B, a text display may be presented to the agent in operation 220. The text display may remind the agent that they should ask the individual for their lawyer and/or case number. For example, the text may be presented in a pop-up window on the agent's display stating: "If the individual has filed bankruptcy, you should ask them for their lawyer's name and telephone number, and the case number if the bankruptcy filing has already occurred. You should not continue to attempt to collect the debt."

In addition, the agent may be presented with an icon for selecting a pre-recorded script that was previously recorded using the agent's voice. Selecting the icon requests that the pre-recorded script be played to the called party. This relieves the agent from having to read the script. At the end of a long shift, the agent may be less than enthusiastic, short on patience, or likely to take a shortcut with respect to complying with applicable policies. Thus, allowing the agent to have a pre-recorded script played to the called party ensures that a compliant and clear response is provided to the called party.

After presenting the text reminder to the agent in operation 220, another timer T2 may be started in operation 222, which is used to determine if the agent has responded properly after being reminded. At this point, the agent may opt to play the script to the called party in option 230, or engage in further dialog with the called party and provide the appropriate response in option 232.

If the agent elects to play the recorded script to the called party, the agent indicates this by appropriately interacting with their computer to select the option. There may be, for example, several possible scripts that can be selected and played. Upon receiving the agent's input in operation 250 to play an indicated script, the agent's microphone may be muted in operation 252, the script played in operation 254, and the agent microphone un-muted in operation 256. Thus, the called party hears only the pre-recorded script, and cannot hear any other sounds from the agent (which may suggest to the called party that a recorded script is being played).

If, however, the agent decides to engage in further dialogue with the called party via option 232, then the process flow continues to operation 260, where the agent's responses are analyzed. If the keywords are detected in the agent's response in operation 262, before the expiry of timer T2 in operation 264, then the process is completed. Essentially, the agent has provided a proper verbal response to the called party after being initially reminded.

If the selected words are not detected within the time period T2, i.e., the timer T2 expires in operation 264, then this indicates that the speech analytics component has not detected the appropriate select words in the agent's response. At this point, another warning text can be displayed on the agent's display and/or a warning indication may be sent to the agent's administrator in operation 266. This provides a record of the agent's failure to adhere to the policy, and allows the administrator to investigate in real time. In addition, the call may be recorded to allow manual verification that the supposed agent's failure was correctly assessed. It is even possible that upon detecting a failure in the agent to provide the proper inquiry, the agent could be prevented from immediate communication with the remote party, and the pre-recorded announcement played to the remote party in place of the agent. After the pre-recorded script is played to the remote party, the agent may be able to then communicate with the remote party.

In some cases, the speech technology may not correctly assess the agent's response, and may have incorrectly noted the agent as failing to follow procedures. Meta-data associated with the call recording could indicate the policy failure and the nature of the failure. Tagging of recorded calls in this manner would allow quick identification, retrieval, and review of such calls so that manual verification of the speech technology's assessment can be undertaken.

FIGS. 2A and 2B provide an overview of one embodiment of the concepts and technologies that apply speech analytics for ensuring the agent properly responds to a contact center policy or regulation. Using this same example of a debt-collection context, message diagrams are now presented illustrating one embodiment of the messages that occur between the various components in a call center.

Compliance Enforcement System Architecture

Figure 3:
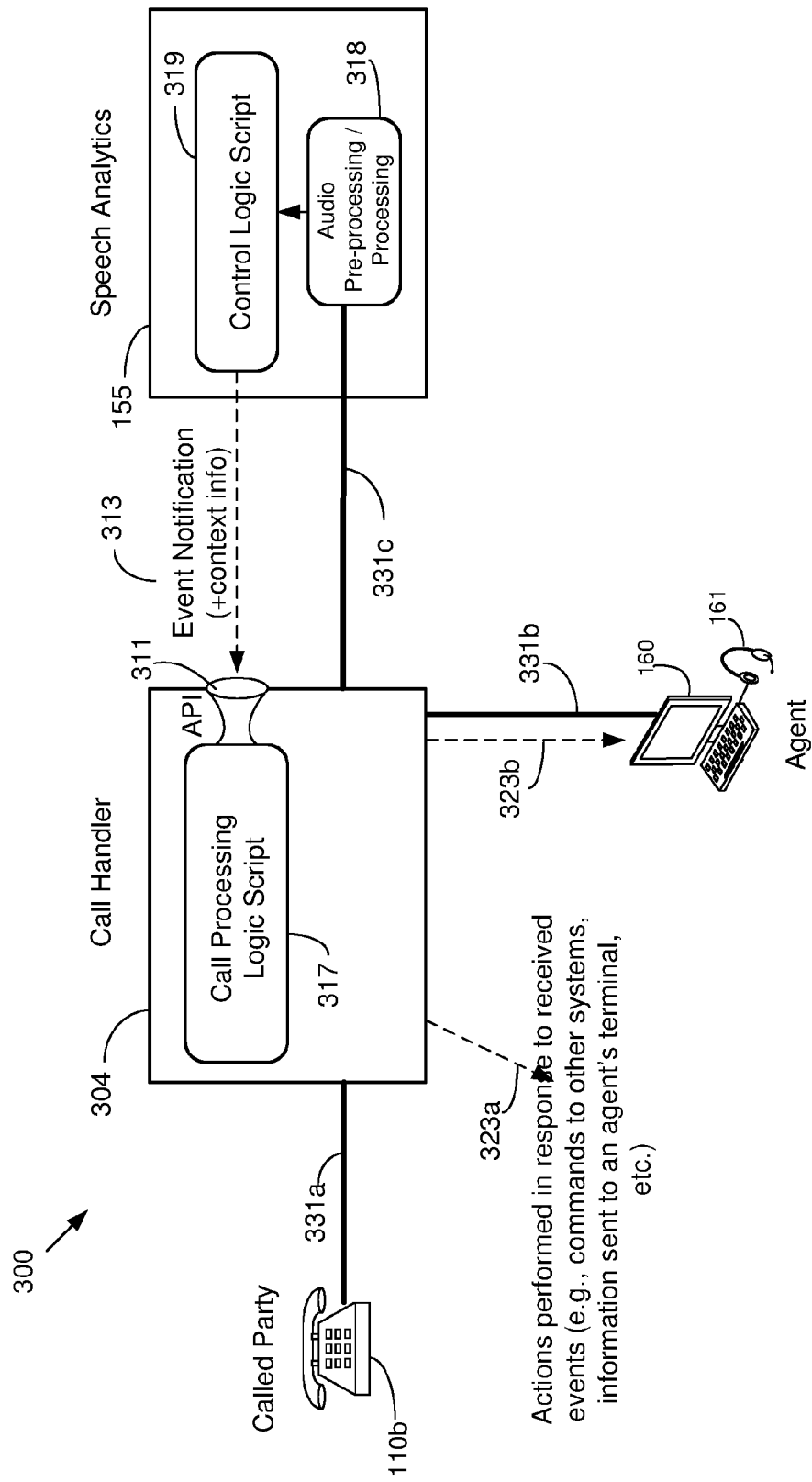
FIG. 3 illustrates an architecture of a compliance enforcement system.

One embodiment of the architecture within a call center for using speech analytics in conjunction with a call handler for agent compliance is illustrated at a high level as a compliance enforcement system ("CES") in FIG. 3. The CES architecture 300 comprises two main components: a call handler 304 and a speech analytics component 155. The call handler may be a dialer, automatic call distributor, computer-telephony integration server, or some other component associate with handling of calls. The call handler has knowledge of the existing calls and related information involving agents. In some embodiments, multiple components may form the call handler. For example, the call handler may comprise a switching component and an application server. In other embodiments, the call handler may comprise an ACD for handling incoming calls and a dialer for handling outgoing calls. Other functional configurations are possible as are known in the art.

In this embodiment, the call handler 304 will have a call leg 331$a$ to the called party 110$b$, which may be an incoming or outgoing call. The call handler will establish a call leg 331$b$ to the agent's phone at their workstation, comprising a computer 160 and a telephone 161. The call handler will also set up a call leg 331$c$ to the speech analytics component 155. In this manner, the speech analytics component is able to monitor and analyze the speech between the agent and the called party and is able to detect the presence of specified keywords. Typically, the speech analytics component does not provide audio on the call to the call handler, but in some embodiments this may occur (e.g., if the speech analytics component is integrated with an interactive voice response unit). In various embodiments, an identifier of some form is used to uniquely reference the call leg between the call handler and the speech analytics component.

The speech analytics component 155 may comprises a module 318 for receiving the audio on call leg 331$c$, and may perform various pre-processing on the audio. This pre-processing may involve identifying audio from the agent versus the remote party, and processing the audio into phonemes used in detecting keywords. Further processing of the audio may then involve detecting the keywords and providing appropriate indications to the control logic script 319.

Once the speech analytics component is able to receive audio of the call, it is able to detect the presence of keywords uttered by the agent or called party. That provides some utility by itself, but additional functionality is required beyond the mere detection of words to fully utilize the capabilities of the speech analytics component. This additional functionality comprises three capabilities.

The first capability is the control logic script 319 that is a program executed by a processor in the speech analytics component. The control logic script is configured to define which party's speech should be monitored (e.g., agent, remote party, or both) and what word(s) should be detected (e.g., what keyword sets should be used). In some embodiments, additional functionality may be defined in the control logic script as to whether events are reported indicating that certain words are not detected by a specified party within a certain time period. The control logic script 319 is also able to receive call leg identification information for the call leg 331$c$ and associate the call identification information with the keyword detection. Since there may be a number of simultaneous calls monitored by the speech analytics component that are associated with a plurality of campaigns, and potentially involving a number call handlers, it is necessary to determine for which call the keywords are detected.

The control logic script 319 may also control when keyword sets are used ("applied") to examine a party's speech. For example, it may be only appropriate to monitor the agent's speech based on certain conditions occurring, such as detecting a keyword first uttered by the remote party. Alternatively, the control logic script may report out whenever any keywords are detected for a particular party, without being dependent on other conditions occurring.

The control logic script can be defined so that a single control logic script is executing for all incoming call legs 331$c$. In other embodiments, multiple control logic scripts can be defined that operate on distinct calls. For example, a first control logic script could operate for calls associated with a certain incoming call campaign, whereas a second control logic script could operate for calls associated with another incoming (or outgoing) call campaign. Thus, the control logic script can be associated to process calls for a particular call campaign, call type (incoming or outgoing), for a particular agent or set of agents, for a particular incoming telephone number, trunk group, or other distinguishing aspect.

The control logic script can be programmed to apply different keyword sets at different times. This provides flexibility as to defining which keyword sets are analyzed and when, and may also save processing resources. For example, calls which are not debt collection calls would not require applying the keyword sets to the party's speech defined for debt collection calls. Because there may be a number of different calling campaigns, and a number of compliance regulations that are being monitored, this ability to define which sets are to be used has the potential for significantly saving processing resources as the scale and application of the system increases. Of course, other embodiments may simply define a large keyword set able to accommodate all needs and simply report event notifications whenever a party speaks one of the keywords.

The second capability involves a communication capability where events 313 of the detected keywords are communicated in real-time to the call handler 304, specifically the call processing logic script 317. This involves using an application programming interface ("API") 311 that is incorporated into the call processing logic script 317. These messages may be conveyed using a LAN, WAN, bus, or other communication facility between the speech analytics component and the call handler.

The event notifications 313 include contextual information, which provides information about what was detected by the speech analytics component at what point in a call, by which party, and for which call. A mere indication that a word was detected is of little use to the call processing logic script 317, unless it is known for which call, keyword set, and which party the event applies to. (The call handler may be handling dozens of calls.) Further, in some embodiments, the event notification may reflect the absence of the detection of a word by a party at a certain point during a call. Additional contextual information may be required to properly interpret detection (or lack thereof) of certain words by the call handler.

The need for additional context information in certain situations can be illustrated with two examples. In one example, the agent is required by call center policy to thank the caller for their call, and ask if there is anything else that they can assist the remote party with. Thus, at some point during the call, such appropriate words should be detected in the agent's speech. As long as this is detected before the end of the call, the call center policy can be deemed to be complied with. Thus, if the speech analytics component informs the call handler that such speech was detected during a specific call, then the contextual information may be sufficient.

Now, in the second example, the agent is required to confirm the telephone number to the called party after the called party requests to be placed on a do-not-call list. If the speech analytics component merely informs the call handler that the agent did not confirm a number, then this information is insufficient, since it is not known whether the called party first made a request to be placed on the do-not-call list. It is necessary for the event notification to provide additional contextual information, namely that the called party requested to be placed on the do-not-call list along with a report of whether the agent confirmed the number or not. Thus, determining whether an agent complied with a policy may require more than just knowing what the agent did (or did not) say.

How this additional context information is communicated by the speech analytics component can vary. Using the above example, a first event notification could be sent reflecting that the called party requested to be placed on the do-not-call list, followed by a second event notification reflecting that the agent did (or did not) confirm the number. Alternatively, a single event notification could be sent indicating that a request was detected for being placed on the do-not-call list and the agent did (or did not) confirm the number. Still yet, a code could be assigned to this situation, and only a single code could be transmitted which reflects a specific context.

The third capability that is required is a corresponding call processing logic script 317 executing in a processor in the call handler 304. This call processing logic script 317 defines what actions should occur upon receiving the event 313 from the speech analytics component. While there is value in the speech analytics component by itself being able to detect certain keywords in a conversation between an agent and a called party, there is significant additional value in the call handler receiving events from the speech analytics component and being able to respond in different ways for different calls. These responses may be based on other information that may be unavailable to the speech analytics component.

The responses performed by call processing logic script 317 are referred to as actions. These actions may involve messages 323a to other call center components or applications, or messages 323b to the agent's computer 160. The actions may include, by way of example and not limitation:

Writing data to a file. Data can be written indication a particular context that occurred, what keywords were detected and for which calls. An agent may have a "compliance file" that indicates when they did or did not comply in certain contexts.

Informing the agent by presenting pop-up text displays on their computer. This may provide a defined set of information to agent of a proper response for handling the context. This may be text presented as a guideline or text presented as a script the party may be able to read.

Playing a pre-recorded script to the called party. An icon or other control widget may allow the agent to select and play a pre-recorded announcement or script to the called party.

Invoke call handling functions. The action could place the remote party on hold, transfer the remote party to music on hold, transfer the remote party to another agent, barge in the call and play an announcement without the agent selecting to do so, bridge on a supervisor, mute the agent's microphone, or park the call, etc.

Invoking an application on the agent's computer. This could open a credit card payment application, an application on a CRMS used by the agent to handle the call, update account information, update do-not-call preferences, etc.

Writing data to a call control application. The action could disposition the call, invoke a call recording application, alter the control logic flow in the call handler or the speech analytics component, update a dashboard viewed by a supervisor providing call related status indicators or statistics, etc. For example, detection of a keyword by one party may cause another keyword set to be then applied to the other party. Other applications may involve setting timers for determining whether an appropriate response in the form of an event notification is received.

Notifying the agent's supervisor of a detected condition. This may involve establishing a call, sending an email or text message to an address or a set of addresses, along with the context encountered, agent identification, and further information as to the status of the call. For example, an agent using profanity on a call may result in an immediate text message sent to the agent's supervisor.

Identify Agents For Training. Certain non-compliance determinations may be recorded in a file, or provided to a training system to allow automatic training of agents to occur on selected topics.

Invoke function calls. Various function calls, web services calls, remote procedure calls, or methods can be invoked at various times as desired. This may facilitate the agent's handling of the call by invoking well known functions, such as disposition a call, reporting status information about the call, place the telephone number on a do-not-call list, report a recently ported mobile number, etc.

The list of potential actions that the call handler can take upon receiving an event notification is broad, and no doubt those skilled in the art will be able to expand this list in light of the concepts and technologies disclosed herein.

For example, the call processing logic script can invoke an action of searching based on keyword terms. This could be used to provide information from various sources, such as knowledge management systems, as information presented on the agent's desktop display. In other words, the call processing logic script could receive a event notification indicating a keyword and then search a database for all files having that keyword. However, the function of searching information repositories for matching content and presenting this to the agent is not the same as displaying a pre-defined set of text information, such as informing the agent how to handle the call. In other words, searching for information among information sets (e.g. files) is not the same as retrieving a specific set of information that is present whenever the agent one of several keywords are stated by a party. In most cases, detection of one of several keywords in a keyword set results in a single, pre-defined information to be present to the agent regarding the policy of how to handle the compliance situation. This is not the same as using information of the keyword that is detected and searching among a plurality of information sources as to the most relevant content.

The ability to react to reported events 313 from the speech analytics component allows the speech analytics component to focus on detecting keywords, without having to become involved with call center-specific policies, data. Nor does the speech analytics component have to implement capabilities that are not core to operation of the speech analytics component. In other words, the control logic script in the speech analytics component is focused on reporting speech detection, not on how to interpret what the presence or absence of these keywords means for the context of a particular call. Whether certain keywords are detected (or not) between the agent and the called party fundamentally relate to the call center's policies and regulations that govern the call and not generally to speech analytics. Further, the applicable policies and regulations are highly specific to the call center, the call handler equipment, the nature of the call, and the call campaign. It is preferable that these aspects are segregated from the speech analytics component, since the policies and regulations are subject to change, and it is desirable to insulate the speech analytics component from aspects unique to call center operation as much as possible. Further, because a variety of call handling equipment may be used, it is desirable to avoid having to customize the speech analytics component to perform capabilities unique to each configuration of the different types of call handling equipment. For example, the speech analytics component may be shared among various call handlers in a call center, and/or provided on a service bureau basis. Thus, the call center operator may not be able to (and may prefer to avoid) having to reprogram the speech analytics component each time a new or modified regulation is discovered. Rather, the reconfiguration of the speech analytics component may be accomplished by merely loading or modifying the keyword sets and the control logic script as needed.

The call processing logic script 317 allows the call handler to determine when an agent has not complied with a certain policy as defined by the call center operator. For example, based on the type of call, the agent may be required to inform the called party at the beginning of the call of certain information. Depending on the context, it may be merely desirable that the agent uses a specified introductory statement, or it may be required that the agent uses a very specific introductory statement, and failure to do so may constitute a regulatory violation that can subject the contact center operator to fines. Assuming the greeting format is merely desirable, then based upon the event notification from the speech analytics component (or lack thereof), the call processing logic script may handle the context appropriate. For example, the call processing logic script may simply record a notation in an agent performance file that the agent failed to meet an aspirational policy. If the introductory statement is provided to meet a regulation and compliance is required, then the call processing logic script may not only record a notation upon failure to detect the statement, but present a text warning to the agent on their computer and immediately notify the agent's supervisor. Thus, a call handler via the call processing logic script has the flexibility to provide different types of actions based on defining different call processing logic scripts to meet different policies or requirements. If the call processing logic script were integrated with the speech analytics component, then a new module would be required for addressing each variation. This would increase the complexity of the speech analytics component and provide a processing burden as the architecture is scaled.

The call processing logic script can also assist the agent in compliance with certain policies by performing actions, such as informing the agent of what a proper response requires for a certain situation. Once the call processing logic script receives certain event notifications from the speech analytics system, it can determine for that agent what the appropriate response should be. For example, for a novice agent, the call processing logic script could pop-up detailed information including a text-based script that the agent should read to the called party. Or, the call processing logic script could present options of pre-recorded scripts in the agent's voice that the agent can command to be played to the called party. If the agent is, instead, an experienced agent, the call processing logic script could merely present a reminder/warning to the agent. The flexibility as to how the call processing logic script handles an event notification allows the call center operator to define an appropriate response for the event notification taking into account various circumstances.

In addition to assisting the agent with compliance, the call processing logic script can also increase agent productivity by assisting the agent with activities associated with handling the call. The call processing logic script may invoke certain applications or write data to certain applications or files. This may save a few seconds of keystroke time and minimize agent data entry errors during a call. Since this may be repeated for many calls and for many agents, the savings can be significant.

For example, in certain contexts the remote party may choose to purchase a product or make a payment by credit card. This requires the agent to open a credit-card payment application on their computer screen, and then follow a strict sequence of steps, namely asking for the card type, the card number, expiration date, and security code. The call processing logic script can facilitate opening the credit card application. After the agent asks the called party "would you like to pay by credit card?" and the called party says "yes", then the call processing logic script may receive a corresponding event notification from the speech analytics component identifying this context. Namely, the event may inform that these keywords have been detected by the speech analytics component. The call processing logic script may then invoke the credit card application on the agent's computer, thus avoiding the agent having to find and select the icon to open the credit card application. In addition, the call processing logic script can select and play several appropriate scripts recorded in the agent's voice, which include voice prompts for requesting the credit card type, number, etc. Further, the call processing logic script can instruct the speech analytics component to monitor and report back with the credit card type, number, etc. spoken by the remote party. The call processing logic script can then present the card number on the agent's screen for verification. Thus, in such an embodiment the agent can hear a dialogue between the remote party and the pre-recorded scripts and see the corresponding text-based display of the answers on the agent's computer. The agent can view the information, verify that the recognition of the remote party's response is correct, and then simply click on an icon to request that the charge be processed by the credit card application.

In other embodiments, the call processing logic script can open a customer relationship management ("CRM") application, access a web page, retrieve text, email information, etc. on behalf of the agent. For example, if the customer indicates that they would like to place an order, the call processing logic script upon receiving the event could open up the product ordering application.

Another example of how agent efficiency may be increased using the concepts and technologies disclosed herein involves the call processing logic script coding a call on behalf of the agent at the end of the call. "Coding a call" refers to entering a disposition code by the agent on an application executing on the agent's computer. The disposition code reflects status information (the disposition) about the call just completed by the agent. The definition of these codes varies, as call center operators have flexibility in defining how granular these codes may be. For example, if the answering party indicated that the intended called party has moved, or if the telephone number has been reassigned, the agent may enter a disposition code indicating that the number is no longer associated with the intended individual and should not be re-dialed or attempted again. The call processing logic script may receive an event notification from the speech analytics component reflecting this context, and pre-populate the appropriate disposition code in the call processing application for the agent. This saves time for the agent, and the agent merely has to confirm the code value at the end of the call. Although the time savings may be only a few seconds, this activity may be required for every call by each agent, and when multiplied for all call agents, the time savings may be significant.

It becomes evident that the call processing logic script becomes a powerful tool to augment the call center's capabilities of using the speech analytics component. The call processing logic script allows a variety of call center agent policy violations to be avoided, detected, or mitigated. By informing or warning an agent of a required response, the policy violation by an agent can be avoided. By detecting an actual policy violation, the agent policy violation no longer goes undetected for many calls, possibly over many days. Finally, by responding to a policy violation immediately, it is possible to mitigate the impact of the policy violation while the agent is still on the call. None of these capabilities are possible without the call processing logic script executing in the call handler. Simply having a sophisticated speech analytics component without a corresponding call processing logic script that is able to act upon the event notifications does not allow such features to be provided.

As with the control logic script in the speech analytics component, the call processing logic script can be defined so that a single control logic script is executing for all incoming call legs 331*a*. In other embodiments, multiple call processing logic scripts can be defined that operate on distinct calls. For example, a first call processing logic script could operate for calls associated with a certain incoming call campaign, whereas a second control logic script could operate for calls associated with another incoming (or outgoing) call campaign. Thus, the call processing logic script can be associated to process calls for a particular call campaign, call type (incoming or outgoing), for a particular agent or set of agents, for a particular incoming telephone number, trunk group, or other distinguishing aspect. Although the call processing logic script in the call handler is associated with a particular control logic script in the speech analytics component, it is not required to be a unique one-to-one correspondence. Specifically, multiple different call processing logic scripts (in the same or in different call handlers) may interact with the same control logic script in a single speech analytics component.

The call processing logic script also can control aspects of the control logic script in the speech analytics component, indicating when it should use certain keyword sets for which calls, and for which parties. The call processing logic script can utilize various conditional logic commands and other logical constructs to determine when and how certain actions are to be performed. This may also involve establishing timers or other conditions that detect when a keyword was or was not detected. For example, the absence of receiving a keyword during a specified time period can be interpreted as that party not speaking the keyword.

In some embodiments the call processing logic script may incorporate multiple threads of logic for acting on distinct event notifications, or separate call processing logic scripts may concurrently act upon the same call. The call processing logic script can be programmed to handle various compliance contexts, so that it is flexible enough to be defined by the call center operator as needed to perform real-time agent compliance monitoring.

The call handler also maintains other information that allows the call processing logic script to perform the necessary functions. For example, the call handler may know (or have access to) information regarding the agent's supervisor or skill set, so that the call processing logic script can take actions dependent on the agent-specific information. This information is not readily available to the speech recognition component, and provides another reason why the compliance specific aspects are implemented in the call processing logic script.

API Protocol

Returning back to FIG. 3, the call handler 304 is likely serving a plurality of agent workstations, e.g., agent computers 160 and phones 161. Thus, there is likely a plurality of call legs 331c between the call handler and the speech analytics component 155. Each event notification 313 received by the call processing logic scrip must be able to map the call reference information in the event to a particular agent workstation, so that any actions 323b performed that involve the agent's computer can be uniquely addressed to the appropriate agent's computer. Other actions 323a may be directed to a common resource (e.g., a database) that all agents use, which does not require the same mapping.

Thus, the event notification message received by the call handler from the control logic script may include several pieces of information. First, a call identifier is included in the event notification. Presuming that there may be multiple call legs 331c between the call handler and the speech analytics component, call identification information must be included so that the call processing logic scrip knows what call the event pertains to. Second, the event notification may include identification of which keyword set was involved. In some embodiments, multiple keyword sets may be applied to a party, and may be necessary to know from which keyword set(s) a phrase was detected. Third, depending on how keyword sets are defined, information may also be provided as to which party was involved in matching a word in a keyword set—e.g., the agent or the called party. Finally, there may be benefit to indicating which word was detected in the keyword set.

It is presumed that events are transmitted in real-time from the speech analytics component to the call handler. In some embodiments, a time-stamp of the detection time may be provided.

Thus, the call processing logic script knows upon receiving an event notification which call is involved, what keyword and keyword set is involved, whose speech was detected, and when the detection occurred. There may be a fixed or variable structure of the API protocol, and a limited set of elements may be sufficient to provide the necessary information.

The API protocol between the speech analytics component and the call handler can vary in complexity. The complexity depends in part on where functionality is allocated between the control logic script in the speech analytics component and the call processing logic script in the call handler. In one embodiment, the more complex logic processing is placed in the call handler as opposed to the speech analytics component. This simplifies the functionality in the speech analytics component. An example will illustrate the tradeoffs.

Returning to the debt-collection example, an event notification from the speech analytics component could indicate to the call handler that a remote party was detected as using the word "bankruptcy" and then a second event notification could indicate detection of the agent speaking the word "lawyer." This would allow the call handler to detect that the agent complied with the appropriate policy.

However, what if after the event notification that reported the called party used the word "bankruptcy" there was no follow-up event notification that the agent used the word "lawyer?" The call processing logic script could start a timer upon receiving the first event notification, and if a second event notification is not received regarding the agent speaking the word "lawyer" within 60 seconds, it can be presumed that the agent did not respond properly.

It is also possible to implement this timer in the control logic script and avoid the timer being implemented in the call handler. This would allow the speech analytics component to start the timer after detecting the called party's match of the keyword set. However, in order to convey this, additional message formats would have to be defined. The control logic script would send a first event notification when the called party speaks the word "bankruptcy" and would have to send a second event notification signifying that the agent did not speak a word from the second keyword set. It would not be difficult to define such a message, but this example illustrates that the definition of the API protocol may be impacted by how the functionality is distributed between the call handler and speech analytics component (depending on whether the timer is in the call handler or speech analytics component).

In light of the concepts and technologies disclosed herein, those skilled in the art can readily define a protocol comprising syntax and semantic element definitions for the event notifications sent by the speech analytics component to the call handler. It is envisioned that various embodiments may distribute functionality differently between the call handler and speech analytics component, and hence different protocols may be used. More information of an exemplary call processing logic script structure is provided below.

Message Flow Illustrating API Use

Figure 4A:
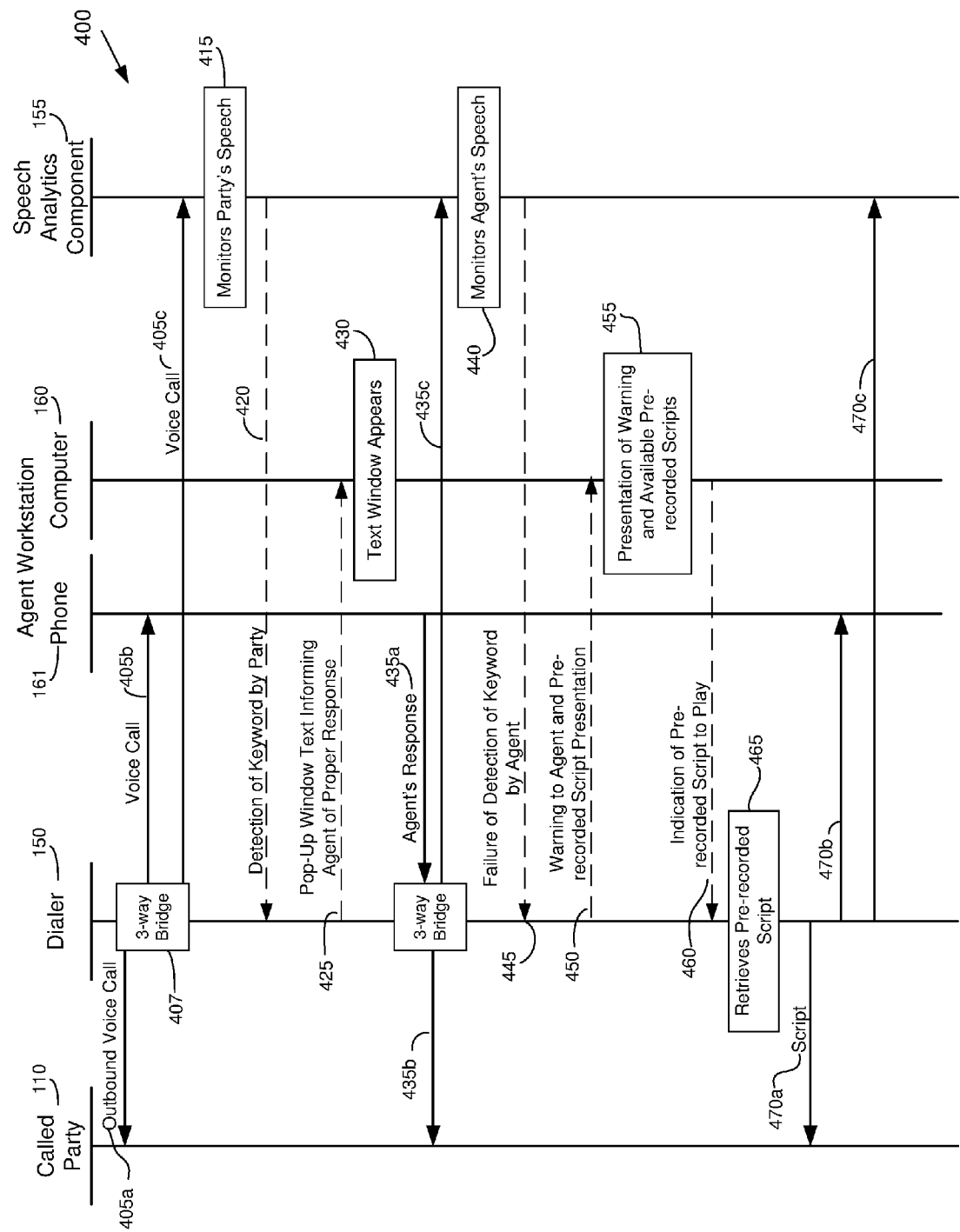
FIGS. 4A and 4B illustrate a message flow of various configurations of using a speech analytics system for facilitating agent compliance in a contact center.

An example application of using the API in the call handler is now illustrated. In this example, the call handler is a dialer. Turning to FIG. 4A, the called party 110, the dialer 150, the agent's workstation comprising a phone 161 and computer 160, and the speech analytics component 155 are shown. Time is represented as increasing in a downward direction. To distinguish between voice communication and signaling messages, voice communications are shown by horizontal solid lines (e.g., line 405b), whereas signaling messages are shown as horizontal dotted lines (e.g., line 420). For purposes of convenience, the figure illustrates the dialer, which comprises the call processing logic script, and the speech analytics component, which comprises the control logic script. Thus, although the signaling messages may be described herein as being sent to the dialer, the messages are actually processed by the call processing logic script in the dialer.

The message diagram 400 begins with the dialer originating an outbound voice call via call leg 405a to the called party. The dialer also establishes contemporaneously a call leg 405b to the agent's phone and another call leg 405c (which may be unidirectional) to the speech analytics component. These call legs may be associated with a 3-way bridge 407 or other suitable bridging device. In summary, the dialer has established a call between the called party and the agent with the speech analytics component being able to monitor and analyze the conversation.

The speech analytics component monitors the called party's speech in operation 415 to detect a word in a specified keyword set. For purposes of illustration, in this example the called party informs the agent that they have filed for bankruptcy. At this point in the call, the speech analytics component informs the dialer of the detection of a keyword 420 that is in the appropriate keyword set. The dialer responds by causing an appropriate pop-up text window to display on the agent's computer to inform the agent of the situation and indicate the proper response to be provided by the agent by sending message 425. This results in the data being displayed on the agent's computer display in operation 430, which may be using a pop-up text window. In some embodiments, the option of the agent selecting a pre-recorded script that could be played to the called party could also be presented to the agent at this point.

In this example, it is assumed that the agent provides a verbal response 435*a* to the 3-way bridge, and the response is provided to the called party and to the speech analytics component over call legs 435*b*, 435*c*. The speech analytics component monitors the agent's response to determine if a proper response is being provided in operation 440. Determining that the agent has, or has not, provided a proper response is accomplished by using another keyword set and detecting whether the agent uses one of those keywords. Detecting whether the agent uses one of the keywords may require a minimum amount of time, since the agent may not use one of the keywords immediately. For example, upon being informed by the called party that they have entered bankruptcy, the agent may respond with, "I am sorry to hear that, we understand that it is an available legal course of action." Thus, the agent may not necessarily use a keyword (e.g., "lawyer") in the initial few seconds of their response. Then, the agent may follow up with "Can you tell me the name of your lawyer?" The appropriate time limit is dependent on the context and may be determined by the call center operator.

If no keyword is detected in operation 440, the speech analytics component sends an event notification via message 445 informing the dialer that no keyword was detected. The dialer, in response, may transmit a message 450 resulting in a pop-up window that reminds the agent to ask the called party for their lawyer's name. In addition, the agent may be presented with an option to play a pre-recorded script. This may result in a pop-up window displayed on the agent's computer in operation 455 with the suitable icons and functions to do so.

In this example, it is presumed that the agent selects the option to play the pre-recorded script, which results in message 460 sent to the dialer. There, the dialer retrieves and plays the appropriate pre-recorded script in operation 465. Because it is recorded beforehand to address a particular situation, the recording can be presumed to be an appropriate response. The result is an audio recording that is played to the called party, to the agent, and to the speech analytics component using call legs 470*a*, 470*b*, and 470*c* respectively.

Figure 4B:
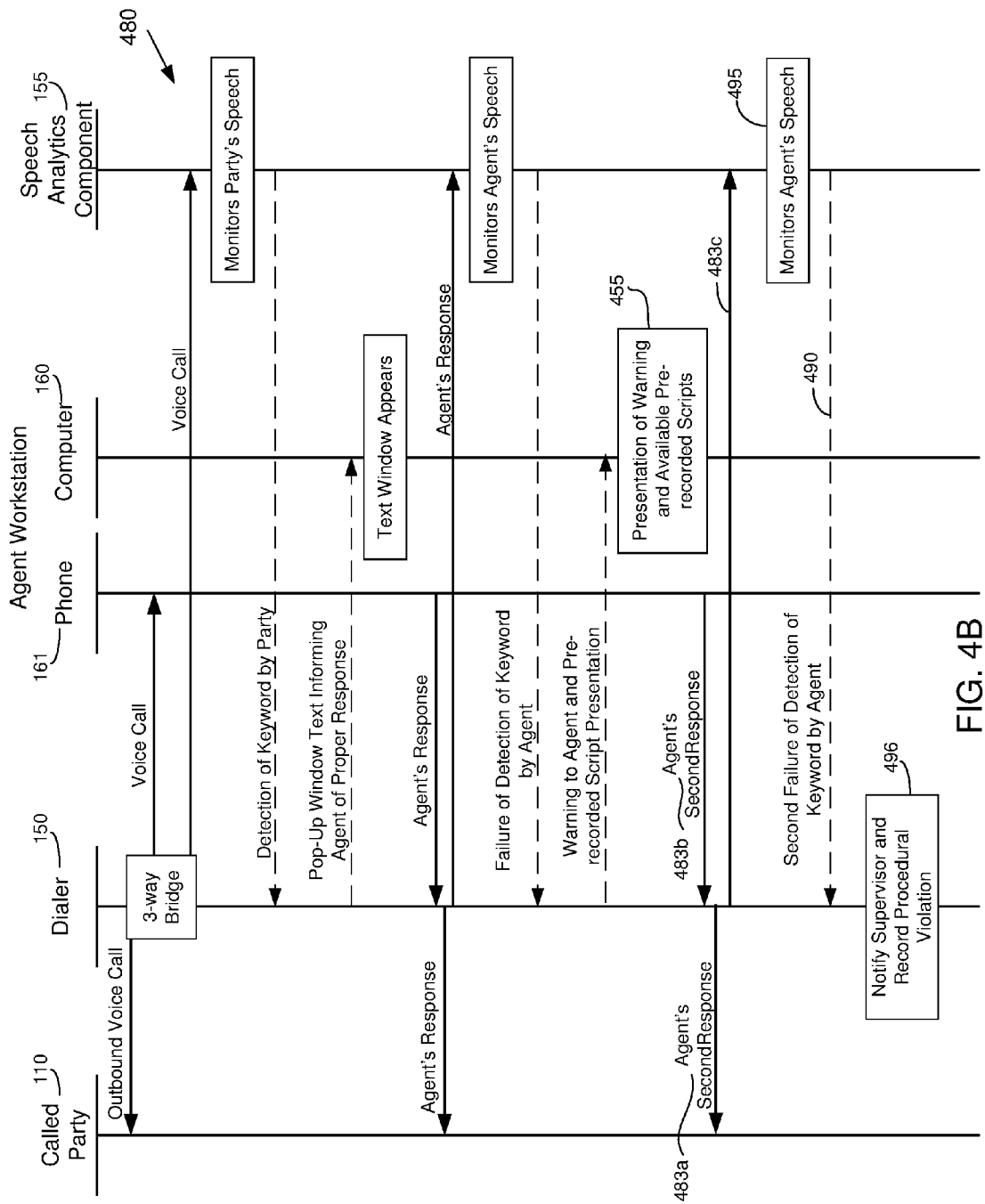

Turning to FIG. 4B, this messaging FIG. 480 presents a slightly different embodiment, but largely based on the same debt-collection situation as shown in FIG. 4A. The steps up to operation 455 are the same, where the agent is presented with the warning text and the option of playing a pre-recorded script. In this embodiment, the agent decides not to select playing the pre-recorded script, and instead continues with a live dialog with the called party.

The agent's second response 483*a*, 483*b*, and 483*c* is provided to the conference bridge (not shown), which then provides the response to the called party and to the speech analytics component. The speech analytics component continues to monitor the agent's speech for the appropriate keyword in operation 495, since the agent has not yet stated a proper response. If there is another failure in detecting the proper response from the agent, then a second event notification is sent via message 490 to the dialer informing it that the agent has not provided a proper second response. At this point, the dialer may take various actions such as notifying the supervisor in real time via a text message and recording a procedural violation in operation 496. Although not shown, the dialer could provide a second warning text window or take other actions.

In the message diagrams of FIGS. 4A and 4B, the speech analytics component functions to detect occurrences of keywords from an appropriate keyword set from either the agent's speech or the called party's speech. Upon detection, or lack of detection, of a keyword, the speech analytics component informs the dialer via an event notification. The dialer then takes appropriate action. In other embodiments, the functionality of the speech analytics component could be integrated into the dialer, or the functionality of the dialer acting upon the event notification could be performed by the speech analytics component such that the actions originate from the speech analytics component. This architecture represents one embodiment, and those skilled in the art after reviewing the present disclosure may develop other alternatives with different distributions of functionality.

It becomes evident that the speech analytics component must know which keywords are to be used on a given call, and whether the application of a particular keyword set applies to the agent's speech, the called party's speech, or both. Further, if the absence of a keyword is indicated, a timer has to be defined to trigger when the event notification is sent to the dialer. In other words, the timer indicates a time period during which the keyword is or is not detected. It can be appreciated that different keyword sets may be required at different times of a call, or may be predicated on detection of a keyword in an earlier keyword set. Thus, subsequent keyword sets may or may not be applied depending on whether a keyword from a first keyword set is detected (or lack thereof is detected).

Compliance Handler Set Groups

It is evident from the above example that the call hander needs to know the context in order to properly process event notifications. The call handler needs to know what keyword sets the speech analytics component is using and how to interpret an event that a keyword has been detected (or lack thereof). The call handler also needs to know for which calls the keyword has been detected. Finally, the call handler also has to know what actions should be taken upon receipt of an event notification. This is determined by the appropriate logic in the call processing logic script.

The information required to process a particular context for enforcing compliance is collectively called a "compliance handler set group" ("CHSG"). A CHSG is a grouping of information that defines how to handle a particular compliance context. The information comprises different defined "sets" of information, which are of different types. There are three main types of information sets: keyword sets, action sets, and logic sets. The keyword sets comprise a grouping of keywords that are related to a common theme. The action sets define a set of allowable actions that may be invoked upon receipt of an event notifying that a keyword in a keyword set was detected. Thus, an action may depend on a first event notification received involving detection of a first keyword set by a first party and then a second event notification received involving detection of a second keyword set by a second party. The scope of the actions can vary as previously described and may include writing data, displaying data to the agent, playing pre-recorded scripts, transmitting a short message service ("SMS") message to a destination, etc.

The third type of information set is a logic set. Logic sets may be of two types: a call processing logic script and a speech analytics control logic script. The call processing logic script may be executed by the call handler (or dialer, ACD, or some other device) and the speech analytics control logic script (also referred to a simply the "control logic script") is executed by the speech analytics component. Note that in some embodiments, the call processing script may be running in a server that communicates to the call handler. The control logic script in the speech analytic component is typically more limited in functional capabilities and largely pertains to defining which keyword sets are to be used, for which party, and reporting events of detecting a keyword in a party's speech. The call processing logic script is typically more feature rich. It defines what actions are to occur in response to receiving an event notification. As mentioned before, in one embodiment greater functionality is in the call handler, as opposed to the speech analytics component. Hence the control logic script in the speech analytics component may be relatively simple control logic as compared to the call processing logic script.

Figure 5:
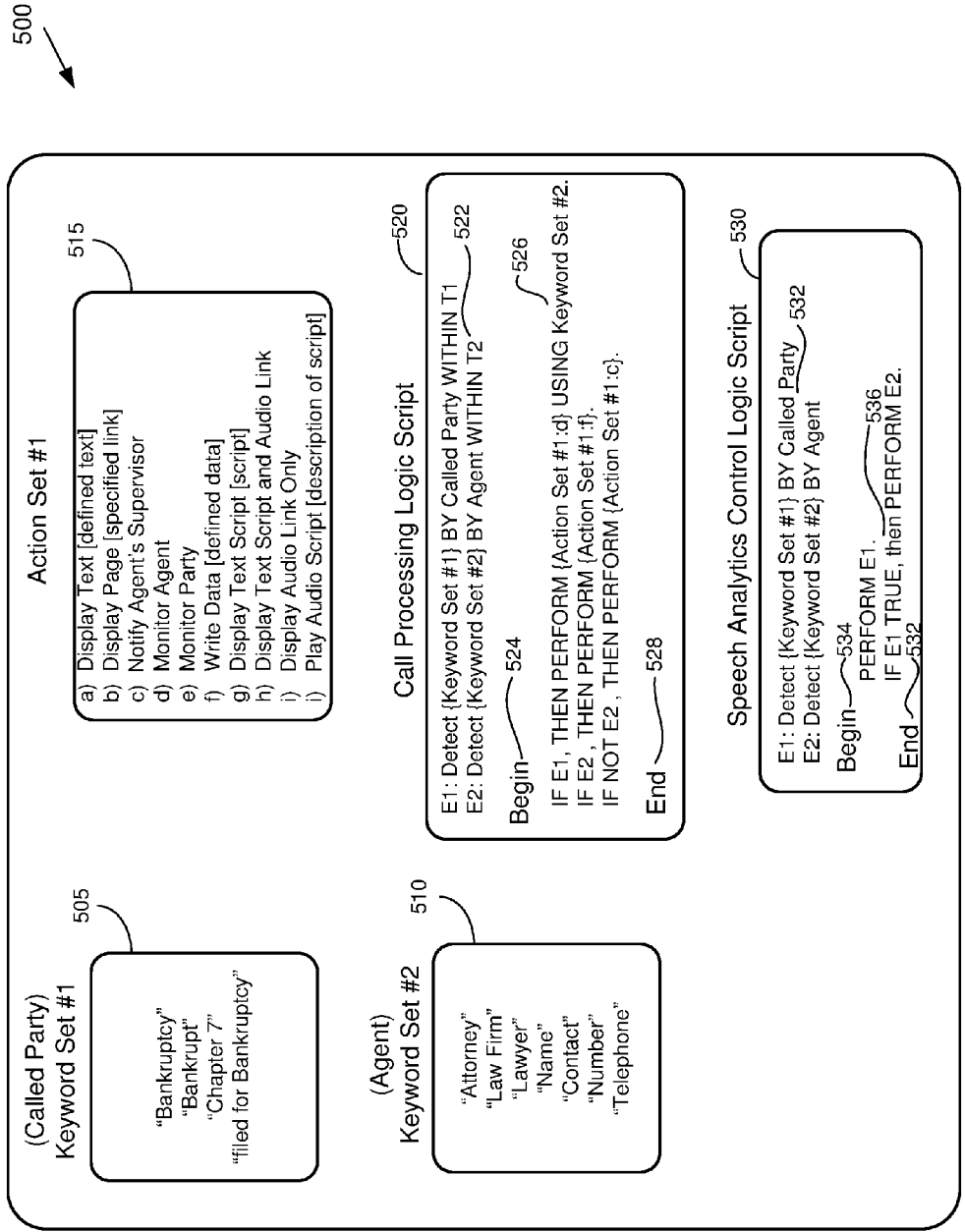
FIG. 5 illustrates conceptual data sets in one embodiment of a compliance handler set grouping used to facilitate agent compliance in a contact center.

The relationship of these different sets of information can be illustrated as shown in FIG. 5. FIG. 5 illustrates one embodiment of a CHSG 500 that addresses the debt-collection context previously discussed. In this embodiment, there are two keyword sets. One keyword set 505 is associated with the called party. "Associating a keyword set to a party" means that the set is used when analyzing speech from that party. In this figure, the keyword set 505 is simply referred to as "Keyword Set #1." In other embodiments, the keyword set may have a more descriptive name, such as "bankruptcy." This keyword set represents words that may be analyzed by the speech analytics component for speech from the remote party. The words in this keyword sets include "bankruptcy", "bankrupt", "chapter 7", "filed for Bankruptcy." These are the words or phrases associated with the debt-collection context, which in this example is determining when the called party has informed the agent of their bankruptcy filing. Other words may be included, or added over time as experience develops in identifying such contexts.

There is a second keyword set 510 that is associated with the agent. These are the words that the agent should be expected to say upon being informed of the called party's bankruptcy. Since the agent is expected to inquire the called party's attorney, these words include, "Attorney", "Law Firm", "Lawyer", "Name", "Contact", "Number", and "Phone Number." These are words that would expect to be spoken by the agent when asking the called party about their lawyer's name. Additional words may be defined to determine if the agent asks for the case number, court identification, etc. In other embodiments, the keyword set name may be more descriptive, such as the "lawyer-inquiry" name previously mentioned.

The keyword sets are used by the speech analytics component to monitor speech. Merely knowing the keyword sets may not be sufficient, as the speech analytics component may require to know which set to use when (e.g., for which calls, and at what time during a call), for which party, and under what situations. For this, the speech analytic control logic script 530 is used. In other embodiments, the speech analytics component may simply apply a single superset of all keywords and report events whenever they occur.

The speech analytics control logic script 530 comprises commands and data that informs the speech analytics component how and when to use the keyword sets. The script begins by defining events 532, which are designated as e.g., "E1" in a preamble. These events represent what keyword set is used for which party. For example, event "E1" in this figure means to detect a keyword from Keyword Set #1 that is spoken by the called party. Event "E2" refers to detecting a keyword from Keyword Set #2 spoken by the agent. The syntax is a label (e.g., "E1") followed by the command "Detect", followed by the name of the keyword set, followed by the command "BY" and the appropriate party (e.g., Agent or Called Party). This example is a command to analyze speech from a certain party using the indicated keyword set. Note that other syntax structures could be defined. This could be used to indicate which campaign or trunk groups are associated with which keyword sets.

The next portion is the core logic portion of the control logic script, which is demarked by a Begin 534 and End statement 532, with commands 536 identified between. The command "PERFORM" means to execute the indicated event(s), which in this case is the aforementioned action E1. The next statement commands that if event E1 is true (has occurred, e.g., a keyword from keyword set #1 is detected), then action E2 is PERFORMED. In essence, the speech analytics control logic script tells the speech analytics component to monitor the called party's speech for the bankruptcy related words, and if detected, then monitor the agent for appropriate response words in the second keyword set. Each time a keyword is detected, an event notification is sent.

For each control logic script in the speech analytics component, there is a corresponding logic script in the call handler. The corresponding logic script in this example is in the dialer (in other examples, it could other forms of a call handler), and referred to as the call processing logic script 520. The call processing logic script processes the event notifications generated by the control logic script and may initiate one or more actions as defined in the action set 515. The action set 515 indicates various possible actions that the dialer may take upon receiving an event notification. Example actions include displaying text (where the text may be defined), displaying a web page, monitoring the agent's speech, monitoring the called party's speech, writing data to a file, etc.

The call processing logic script implements the logic indicating what should be done under certain conditions. The call processing logic script may define conditions 522 in a preamble. In this example, E1 refers is event notification #1, and this event notification is associated with the called party speaking a keyword from Keyword Set #1 within a time period T1. A similar event notification E2 is defined that pertains to the event of detecting whether the agent has spoken a keyword from keyword set #2 within time period T2. It is not by coincidence that the event notifications in the call handler correspond to the events detected in the control logic script.

The core portion of the call processing logic script is again delimited by a Begin 524 and End statement 528. Because of space limitations, only a portion of the control logic 526 for the debt-collection example is shown. The first command is "IF E1, THEN PERFORM {Action Set #1:d} USING Keyword Set #2." This command states that if the condition of E1 occurs within time period T1 (e.g., the called party states a bankruptcy word), then PERFORM the action item "d" from Action Set #1. This action is defined as "Monitor Agent" and specifically, the agent is monitored using Keyword Set #2, which is an appropriate agent response word. The value of T1 can be hardcoded, or another data set of timers can be defined.

The second command "IF E2, THEN PERFORM {Action Set #1:f}" is a command that directs if condition E2 is observed within the time period T2 (e.g., the agent speak an appropriate response word), then execution of the action item "f" from Action Set #1 is performed. This action is to write data to a file. This action could be to record data indicating that the agent provided a proper response and complied with regulations or policies.

The third command, "IF NOT E2, THEN PERFORM {Action Set #1:c}" indicates that if event notification E2 is not observed within the time period T2 (e.g., no event notification of a proper response is detected by the agent), then action item "c" is performed, which is to notify the agent's supervisor. Other actions could be performed. For example, a warning could be initially presented to the agent on their computer screen, and if the proper response is not detected within another time period, then the agent's supervisor can be notified. Other actions may occur, but this limited example is sufficient to illustrate the concepts for dealing with a non-compliance situation.

This command language is exemplary. First, it does not describe how to handle all the scenarios discussed above. For example, the logic script shown does not address displaying an icon to the agent for playing a pre-recorded script, as was mentioned previously. The language's syntax and semantics may be augmented in various ways. Those skilled in the art may adapt or defined another control structure, programming language, syntax, or control language for accomplishing such sequence of functions and operations. For example, the definition of how long a party may be monitored for detection of a keyword can be indicated in various ways.

The administrator may define the script using a text editor to type the commands, or a wizard comprising drop-down menus could be used to define the sequence of operations that are to occur, thereby defining the logic script. Those experienced with API design could define various alternatives for controlling what actions should be taken based on which event notifications are received.

One purpose of FIG. 5 is to illustrate that in order to handle a particular context for a certain type of call, various keyword sets have to be defined. In this example, keyword sets are defined for the called party and for the agent. Further, logic has to be defined as to how the speech analytics component uses the keyword sets. Finally, logic has to be defined by the call controller as to how to interpret the event notifications provided by the speech analytics component. The logic has to be able to perform actions based on the event notifications from the speech analytics component and defines logical conditions as to when certain actions are triggered.

In this example, the focus was only the debt-collection call. Other campaigns may be simultaneously processed, and the call handler and the speech analytics component may have different CHSGs defined for other campaigns. Thus, mechanisms are required to associate a call leg and an event notification to a particular campaign. This can be done using a variety of mechanisms for associated a CHSG to a campaign and associating a call leg to a campaign, so that the appropriate information sets for the appropriate CHSG are applied. It is possible for CHSGs to use common keyword sets, or share the definition of the same actions.

Other embodiments may not require the formal definition of the information sets as disclosed (e.g., keyword sets, actions sets, and logic sets). Other embodiments may define, for example, the allowable actions in the command language itself, instead of referencing a defined action set. Similarly, the keyword sets could be defined in the command language. Other embodiments may allow an administrator to define or identify keyword sets in a different manner.

The CHSG defines the data for handling agent compliance for a particular context. Hence, the name "Compliance Handle Set Grouping." Each compliance condition will require a unique CHSG to define how to handle that particular situation. Because each compliance condition is unique, a CHSG for a debt-collection call is likely to be inappropriate for a telemarketing sales context, and likewise inappropriate for a customer service call. Since call centers may have call campaigns for different purposes, different CHSGs may be defined and associated with these different campaigns. Further, it is possible that a given call in a campaign may have multiple CHSGs associated with it defining how to handle different situations that may arise within a call. Alternatively, the different situations that need to be handled on a call may be defined within a single CHSG. The disclosed infrastructure is quite flexible as to how call processing scripts can be defined to handle various situations that may arise.

For example, in one embodiment, the speech analytics component may have only a single large keyword set. Whenever a keyword is detected, an event notification is transmitted to the call handler. In many instances, it is possible that the event notification indicates a word was detected that is not relevant to handling a particular context. In such embodiments, the call processing logic script may simply ignore such event notifications that are not relevant to a particular context. Thus, the concepts of how the different information sets may be structured, defined, and allocated, may be reflected differently in other embodiments without departing from the spirit of the concepts and technologies disclosure herein.

State Specific Regulations

Many of the compliance policies may be specific to a particular state (i.e., geo-political area). That is, federal regulations may apply to all calls, but state-specific regulation may only apply to calls originating or terminating in a particular state. For example, certain states allow recording of calls with only one party consenting to the recording. Thus, the call center agent can consent to recording, and there is no need to request permission or notify the other party that the call is being recorded. Other states require both parties (or all parties, if a conference call is involved) to consent to recording, so there is a need for the agent to notify or request permission of the other party. Depending on the state involved, the speech analytics component can apply a keyword set to the agent's speech at the beginning of the call that detects whether the agent initially notified or requested permission from the other party. Further, the remote party's response can be analyzed as well.

In this application, it is evident that that whether the agent conforms to the appropriate policy depends on which state the call is destined to. The agent may be made aware of the destination state via a display at their computer workstation indicating the state the call is destined to, and whether the appropriate state regulations require two-party or one-party consent. However, if the call processing logic script is not aware of the state, then the call processing logic script cannot properly evaluate an event notification from the speech analytics component to ensure whether the agent has complied or not. In other words, simply because an event notification indicates the agent did not ask for consent does not mean there is a policy violation. It would only be a policy violation if the call involved a two-party consent state. Thus, the call processing logic script must have access to determine the state the call is associated with.

In some instances this can be accomplished by a function call initiated by the call processing logic script or using an API to an application module that identifies the state. This can be accomplished in the module by mapping the called number to a state, by address lookup, or some other means. In this manner, the call processing logic script can then ascertain the state the call is destined to. Such application modules may be executing in the call handler for other purposes. Further, data structures can be defined that associate a group of states with a certain capability. For example, the call processing logic script could define a first set of states as one-party consent states, and another set of states as two-party consent states. After querying an external module for the state associated with the call, the appropriate data structures could be used to determine whether the call should apply the one-party consent or two-party consent rules. Thus, the call processing control logic can properly process the event notifications to determine if the state specific policies that should be applied.

In some instances, the state associated with the call may not be known. For example, incoming calls from cell phones may have numbers in an area code of one state, but the person is using the mobile phone in another state. Thus, the agent may be asked to confirm the state, even though the state may have been tentatively identified. In other instances, a caller may block their calling number so that it is not possible to even tentatively identify the calling state. The call processing script logic can check that the agent is confirming the state when it is known, or asking about the caller's state if the state is unknown.

Defining and Using the CHSG

Figure 6:
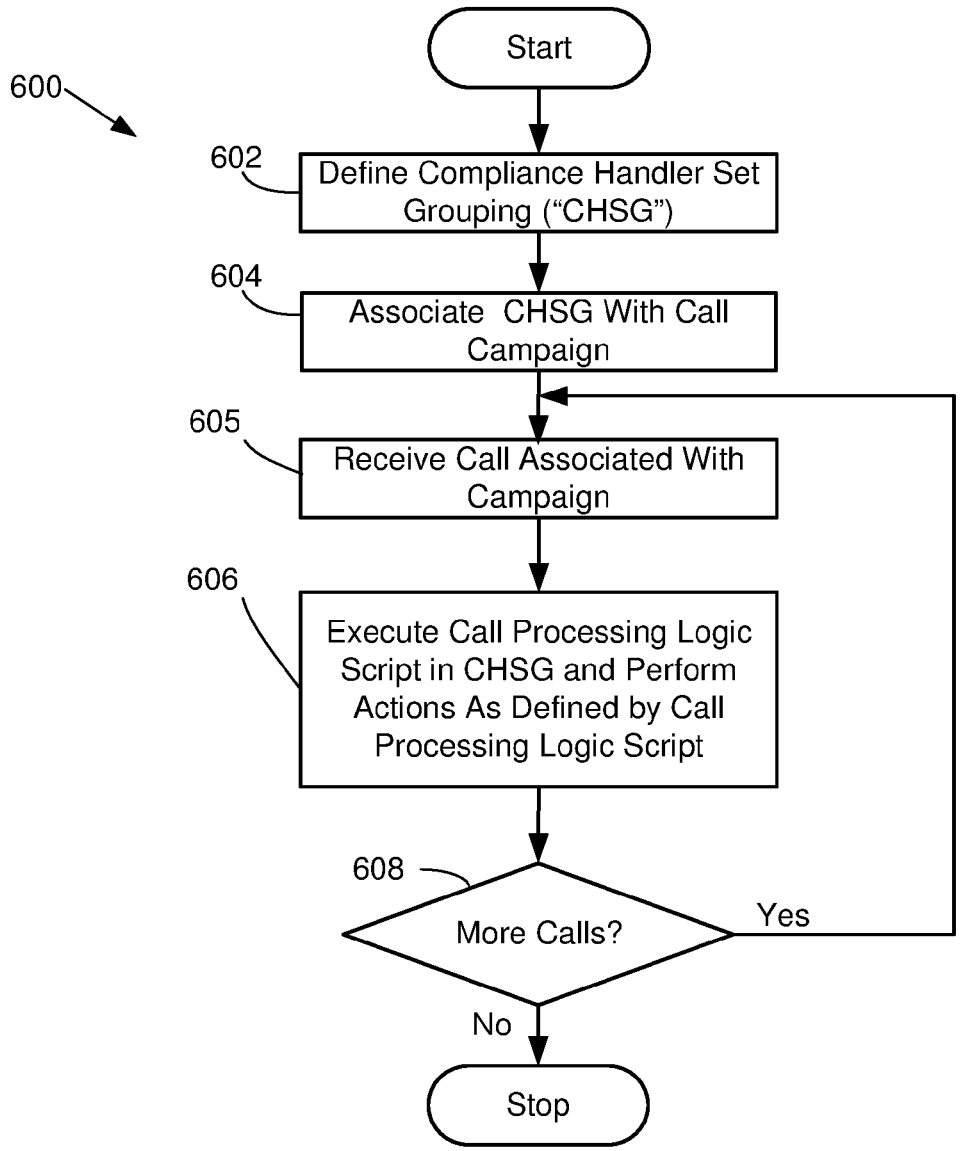
FIG. 6 illustrates one embodiment of a process flow used to facilitate agent compliance in a contact center.

FIG. 6 provides a high level flow of how a CHSG is used in conjunction with a calling campaign. The process 600 initially requires defining the CHSG for handling a particular context in operation 602. Further information on this step is provided in FIG. 7, but it should be evident that defining a CHSG is highly dependent on the nature of the context of the compliance issue that is attempted to be detected and enforced.

Once the CHSG is defined, the CHSG is associated with the call campaign in operation 604. This may involve loading the appropriate data associated with the CHSG into the appropriate call handlers and speech analytics components along with the campaign data. Once this is done, then calls associated with the campaign can be received in operation 605.

For each incoming call, the particular call processing logic script in the CHSG is executed in operation 606. Simultaneously, the speech analytics component is executing the control logic script. The call processing logic script in the call handler involves reacting to various event notifications sent by the speech analytics control logic script, and in response thereto, performs certain actions, which are also defined by the call processing logic script. If there are additional incoming calls in operation 608, then the process loops back to operation 605. If not, then if there are no further calls, the process is completed.

Figure 7:
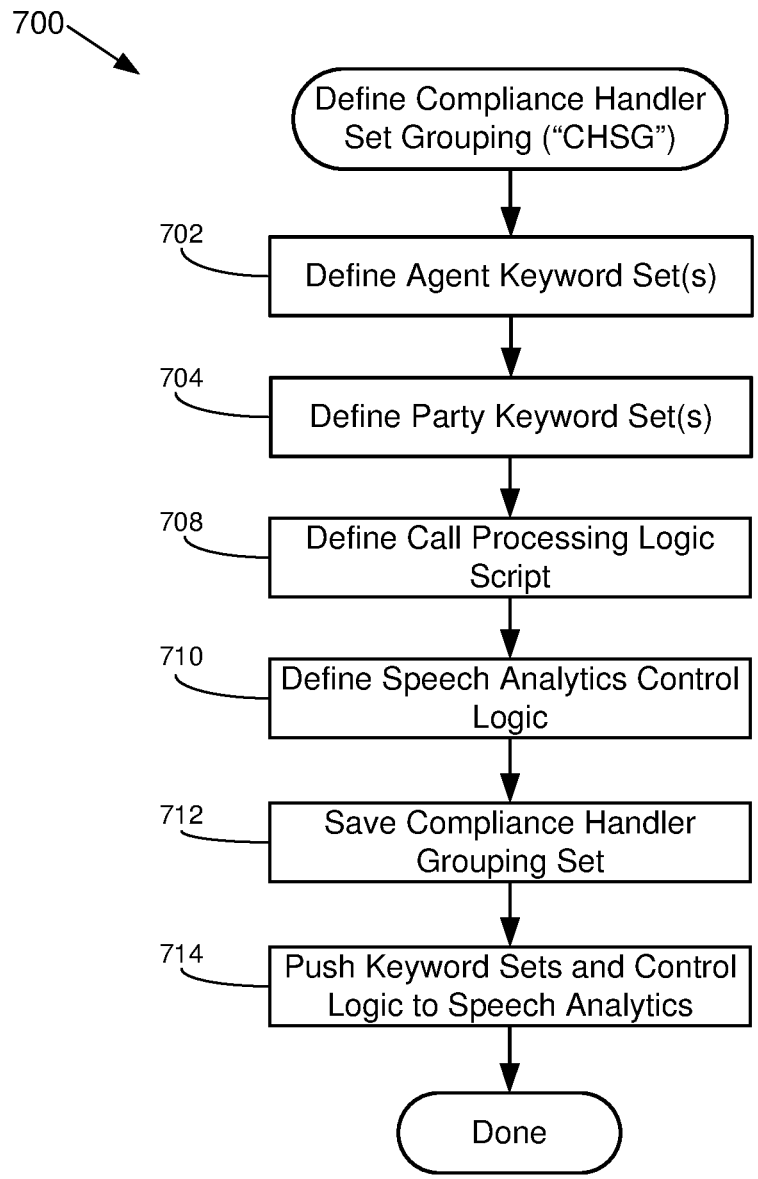
FIG. 7 illustrates one embodiment of a process flow for defining a compliance handler set grouping.

FIG. 7 provides additional detail associated with defining the CHSG for a particular compliance situation. The process 700 begins with defining the agent keyword sets in operation 702. There may be a single keyword set, or multiple keyword sets involved. Similarly, a keyword set(s) may be defined that is associated with the called party in operation 704. In the above example, there was one keyword set for the called party and one keyword set for the agent, but in other embodiments, there may be a plurality of keyword sets for the agent, and no keyword set for the called party, or vice versa. Further, it is not required that these steps are performed in the indicated order.

Next, the call processing logic script is defined in operation 708. The call processing logic script indicates, in part, what actions should occur in the call handler upon detection of a keyword by the speech analytics component. This logic is typically unique for a particular compliance context. A similar control logic script is defined for the speech analytics component in operation 710. In one embodiment, the functions performed by the speech analytics component may be more limited, and pertain to detecting keywords from keyword sets, and reporting the same. In other embodiments, additional functionality could be defined, so that more sophisticated actions can be performed by the speech analytics component upon detection of a keyword. In this embodiment, the functionality in the speech analytics control logic script is more limited compared to the call processing logic script.

In operation 712, the data sets of the CHSG are saved, and in operation 714, the data sets are transmitted (pushed) to the appropriate call center components (if required). At this point, the call center components may be ready to process calls. Note that is some embodiments, the CHSG may be created separately on the call handler and the speech analytics component, so that no information set needs to be pushed to a corresponding component.

Call Handler Processing Flow

Figure 8:
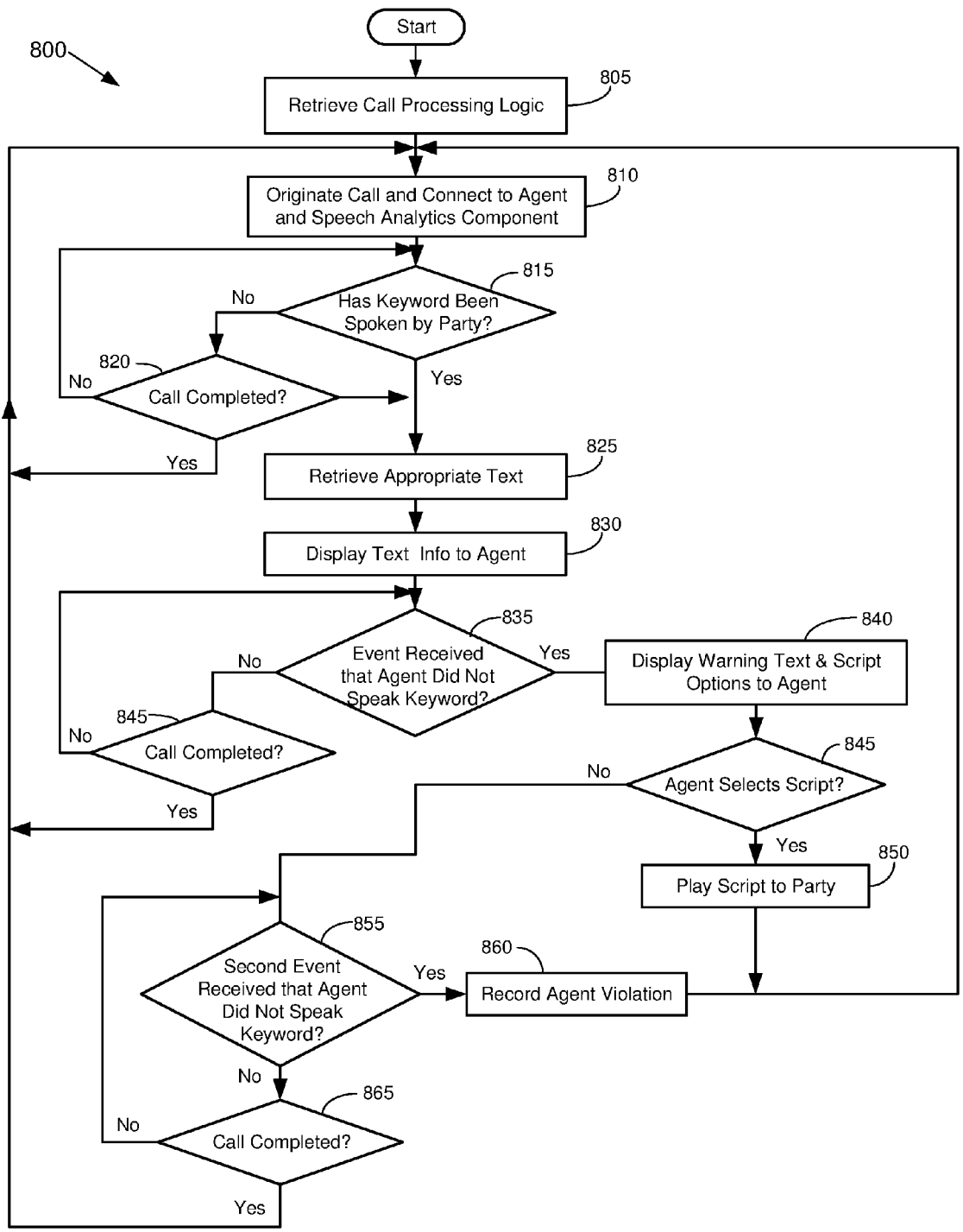
FIG. 8 illustrates one embodiment of a process flow used in a call handler in a contact center to ensure agent compliance with a policy.

The process flow performed by the call handler, which in the debt-collection situation involves a dialer, is shown in FIG. 8. This process flow again illustrates aspects of the debt-collection example previously discussed. This process flow 800 begins with retrieving the call processing logic script for the campaign being executed in operation 805. Next, an outbound call is originated, and a call leg is connected to the agent and to the speech analytics component in operation 810. Next, operations 815 and 820 in combination serve to monitor whether any event notification is received from the speech analytics component for this call. If no event notification is received that a keyword has been detected in operation 815 (e.g., a bankruptcy related keyword spoken by the called party), then the process proceeds to operation 820, which determines if the call is completed. If not, then the process flow loops back to operation 815 to monitor for any received events. Otherwise, if the call is completed in operation 820, then the process loops back to operation 810 for processing a new call.

If a keyword is detected, as manifested by receiving an event that a keyword has been spoken by a party in operation 815, then the dialer retrieves the appropriate text as defined by the script logic in operation 825 and causes the defined text to be displayed on the agent's computer in operation 830. At this point, the agent has been informed of the correct procedures that should be followed upon the remote party declaring they have filed for bankruptcy.

Next, a test determines whether the agent properly responded in operation 835. In this embodiment, the speech analytics component sends an event notification if the proper response was, or was not, detected by the agent within a set amount of time. If an event notification is not received that the agent failed to speak one of the keywords (e.g., indicative that a proper response was provided by the agent), then the process proceeds to operation 845 where a determination is made whether the call has completed. If so, the process loops back to operation 810. Otherwise, the process loops back to operation 835 to continue monitoring the agent's response.

If an event notification is received that the agent did not respond appropriately in operation 835, then another text is provided to the agent's display in operation 840. Specifically, a warning and an option to play a script is presented to the agent in operation 840. If the agent selects the script in operation 845, then the script is played to the called party in operation 850. The process then loops back to operation 810 for processing another call. In other embodiments, the call handler may simply play the pre-recorded script in operation 840 by continuing direct to operation 850, and not allow the agent to make the determination whether to play the script, thereby skipping operation 845.

If the agent does not select the script in operation 845, then presumably the agent is deciding to continue the live dialogue with the called party. The speech analytics component monitors the agent's speech. A test occurs whether a second event notification is received reflecting that the agent did not provide an appropriate response at operation 855. If not, then the process continues to operation 865 which effectively monitors the agent for the second event notification for the remainder of the call.

If an event notification is received that the agent did not speak an acceptable keyword in operation 855, then in operation 860 a violation of policy is recorded. Other actions may include notifying the agent's supervisor. If the second event notification is not received in operation 855, then this means the agent did speak an appropriate response. Once the call is completed in operation 865, the process loops back to operation 810 for processing the next call.

The process flow in FIG. 8 is exemplary, and shows how the call processing logic script may act upon being informed by the speech analytics component that the remote party has detected an event (e.g., they have filed for bankruptcy). Namely, the agent is to be provided with information on how to handle the situation and is provided the option of playing a pre-recorded announcement. If the pre-recorded announcement is played, then presumably a proper response has been provided. If the agent continues with a live dialogue, the call processing logic script waits to see if the speech analytics component indicates a suitable response was provided by the agent. If not, then a warning display is provided to the agent and a second failure to respond by the agent properly results in recording an agent violation.

This process flow is comparatively simple, as much more complex logic flows can be constructed for more complex situations, and additional exception conditions can be defined. However, this process flow is sufficient to illustrate how the dialer can execute a call processing logic script and react to a situation where the called party provides certain information and the agent is then informed how to respond, but the agent then proceeds to ignore the information and fails to provide a correct response.

For example, in operation 835 a test occurs to determine whether the agent failed to provide a suitable response. This requires implementing a timer that defines a time window wherein if the agent does not provide a suitable response, the determination is made that the agent failed to provide the suitable response. This timer could be implemented in the call processing logic script in the dialer, or in the control logic script in the speech analytics component.

Figure 9:
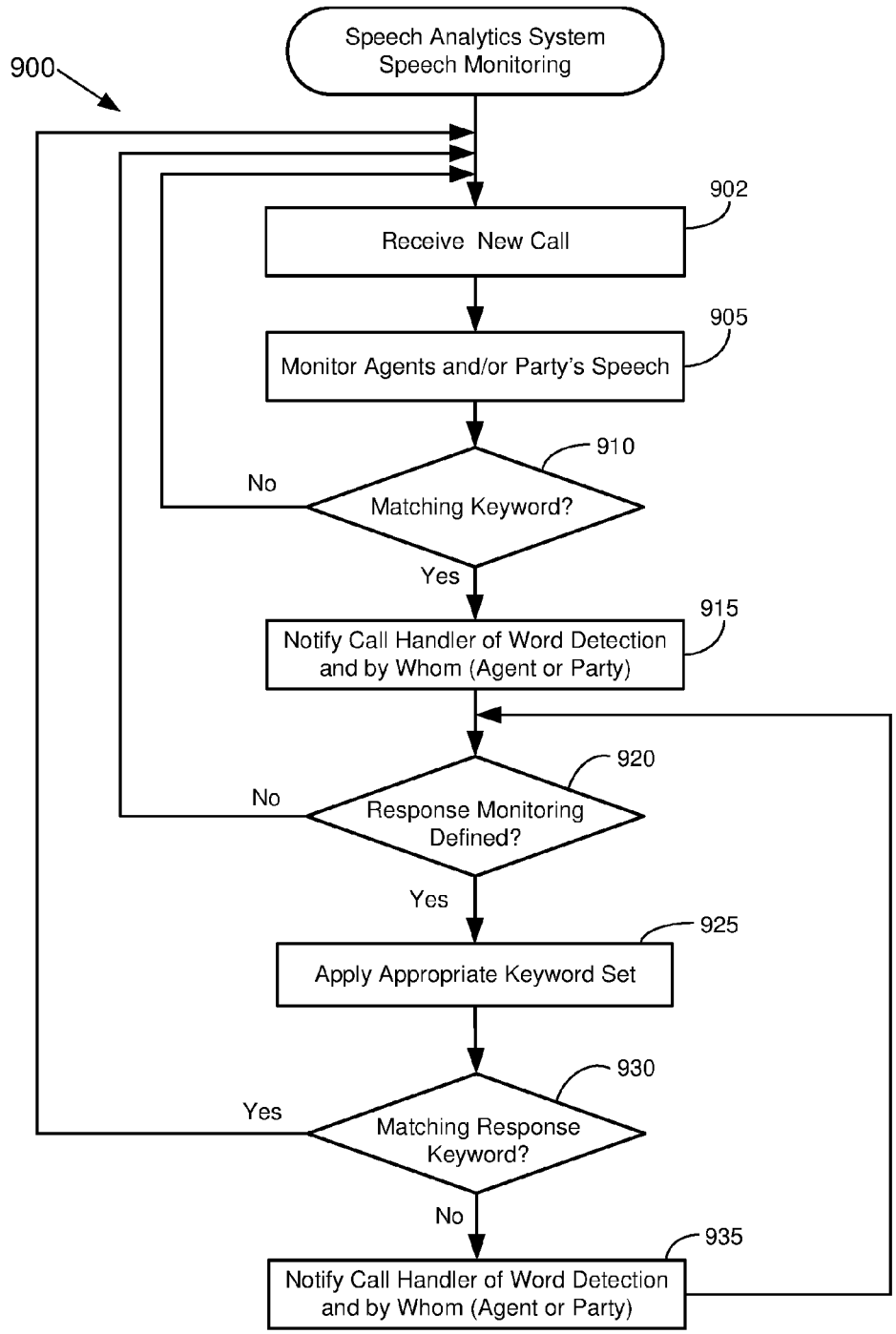
FIG. 9 illustrates one embodiment of a speech monitoring process flow in a speech analytics system.

One embodiment of the processing logic for the speech analytics component is shown in FIG. 9. This processing flow is somewhat generalized in that it is not rigorously defined for the debt-collection example, and does not exactly correspond to the call processing logic script flow. The process flow for FIG. 9 is applicable for this and other contexts, although the explanation focuses on how it could be applied for the above mentioned debt-collection context.

The process 900 presumes that the appropriate control logic script is retrieved and ready for execution in the speech analytics component. The process begins with the speech analytics component receiving a new call in operation 902. Next, the speech analytics component monitors the agent's or the called party's speech (as appropriate) in operation 905. For the example of the debt-collection call, the called party's speech would be monitored first to see if a bankruptcy related word is detected. If no such word is detected during the call, then the process loops back up to operation 902 to monitor the next call.

If in operation 910 a keyword from the appropriate set is detected during the call, then the process notifies the call handler 304 in operation 915 of the word detected, and by whom. In the debt-collection example, the event notification would inform the call handler that the called party spoke a word from the bankruptcy keyword set and it would also identify the particular call involved. In some embodiments, it may inform of the actual word detected.

In operation 920, the speech analytics component executes the control logic script to determine whether there is any additional monitoring to be provided in response to detecting the called party's keyword. If not, the process loops back to operation 902 to process the next call. In the debt-collection example, after the called party is observed to have stated a bankruptcy keyword, the agent is then monitored using another keyword set.

If the control logic script indicates that additional monitoring is required, then the speech analytics component applies the appropriate keyword set as indicated in the control logic script for monitoring in operation 925. If the agent is then observed to have stated a keyword from this set (indicating the agent responded properly), then the processing may loop back and process the next call. If no matching keyword is detected in operation 930 (indicating the agent did not respond properly), an event notification may be returned to the call processor in operation 935 that indicates no match occurred. The processing flow may return to operation 920 to determine if the control logic script requires applying yet another keyword set. In the debt-collection example, there was no third keyword set to be applied.

It is evident that the scripts for the dialer and the speech analytics component have to be designed to work together. For example, in operation 930, the speech analytics component determines whether, e.g., the agent's response matches a keyword. In the debt-collection example, the purpose is to determine whether the agent provided a suitable response after being informed of the called party's bankruptcy. A corresponding function occurs in the control logic script in the dialer to receive and process the corresponding event notification (or lack thereof) from operation 935, whereby if no matching keyword is detected by the agent, an event notification signifies the agent has not provided a suitable response. In FIG. 9, if a response is provided in operation 930, the process simply loops back for the next call and no event notification is sent to the call handler.

This lack of response by the speech analytics component of detecting a keyword in the agent's keyword set is acceptable if the call handler implements a timer which is cancelled upon receiving an event notification of a matching keyword from the speech analytics component in operation 935. In other words, the call processing logic script institutes a timer waiting for an event notification that the agent responded properly. If no event notification is received, the timer expires and a violation is presumed by the call handler. Alternatively, the timer could be instituted in the speech analytics component and an event notification of violation (e.g., a failure to detect a suitable response by the agent within a time period) is reported to the call handler. Those skilled in the art will recognize that the functionality can be distributed in different ways between the call processing script logic and the speech analytics control logic script. Corresponding changes are required in the process flow for the call handler and the speech analytics component, as well in the messaging between them.

Figure 10:
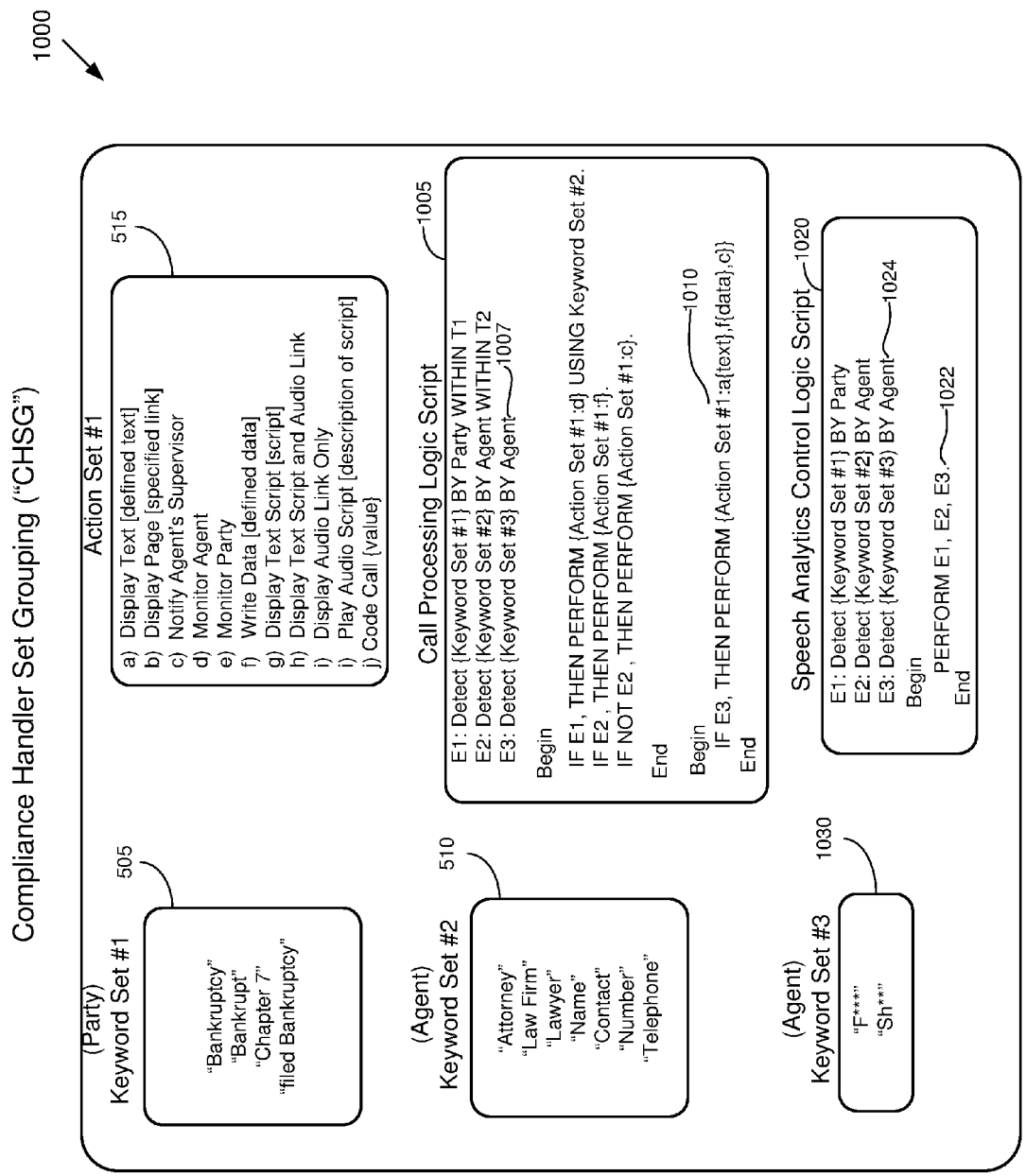
FIG. 10 illustrates another embodiment of conceptual data sets of a compliance handler set grouping used to facilitate agent compliance in a contact center.

Another example of a slightly different CHSG is illustrated in FIG. 10. This builds upon the debt-collection context by adding another keyword set which is continuously applied, but where the logic for using it is separated from the logic associated with the other keyword sets. FIG. 10 shows a CHSG 1000 which incorporates the same keyword set #1 505 and the same keyword set #2 510 for the debt-collection scenario as before, but adds a new agent keyword set #3 1030. This keyword set #3 1030 comprises profanity words, which are continuously applied against the agent's speech to ensure that the agent does not utter any profanities at any time while on a call. Thus, application of this keyword set to the agent is not dependent on detecting any keyword from the called party. Further, it is immaterial whether the called party uses profanity, as the compliance condition is that the agent does not use profanity.

There is additional control logic required for both the call processing logic script and the speech analytics control logic script for using this new keyword set. The speech analytics control logic script 1020 has an additional action. The action includes PERFORM events E1 and E2 as before, but now adds a new event of performing event E3 1024. Focusing on the performance of E3, this event is defined as "E3:Detect {Keyword Set #3} BY Agent". This event is to essentially monitor the agent's speech for any detection of a keyword in keyword set #3 (e.g., the defined profanity words). As defined in the core logic portion, the script 1022 indicates that this event is to be performed at all times, not within a specified time. Its performance is separate and independent of other events detected that occur as a result of other actions associated with keyword sets. Specifically, event E3 is not dependent on detecting any keywords from the remote party. Whenever a profanity is uttered by the agent, an event notification is sent to the call handler. Different message syntax can be used in other embodiments, as compare to the message syntax 1022 shown.

When the speech analytics component reports an event notification of a profanity uttered to the call handler, this indicates detection of the condition defined by E3 1007 in the call processing script logic. This event in the call processing script logic is defined as the same as the event detected speech analytics component, which is to monitor for use of profanity. In other words, the speech analytics component is told by the control logic 1020 to perform an action of detecting profanity, which is reflected by transmitting an event notification that the condition is detected and the call processing logic script 1005 defines what the dialer should do upon detection of the event. Specifically, the logic script 1010 indicates that if event E3 occurs, then "PERFORM {Action Set #1: a{text}, f{data}, j{53}." This indicates which actions from action set #1 are to be performed.

The action "a{text}" means specific text as defined within the brackets is displayed or caused to be displayed using the agent's computer. Next, "f{data}" indicates specified data is to written to a file. Next, action "c" indicates the agent's supervisor should be notified immediately. This action requires a lookup to determine the agent's supervisor. These actions may function to warn the agent against using profanity, record the portion of the call with the profanity so that it can be reviewed or record that a compliance violation occurred, and notify the supervisor so that immediate action can be taken.

The syntax and format of the script logic can vary significantly from that illustrated, depending on the function, script design, and other aspects. Those skilled in the art of script logic design will appreciate that variously scripting formats can be used.

Figure 11:
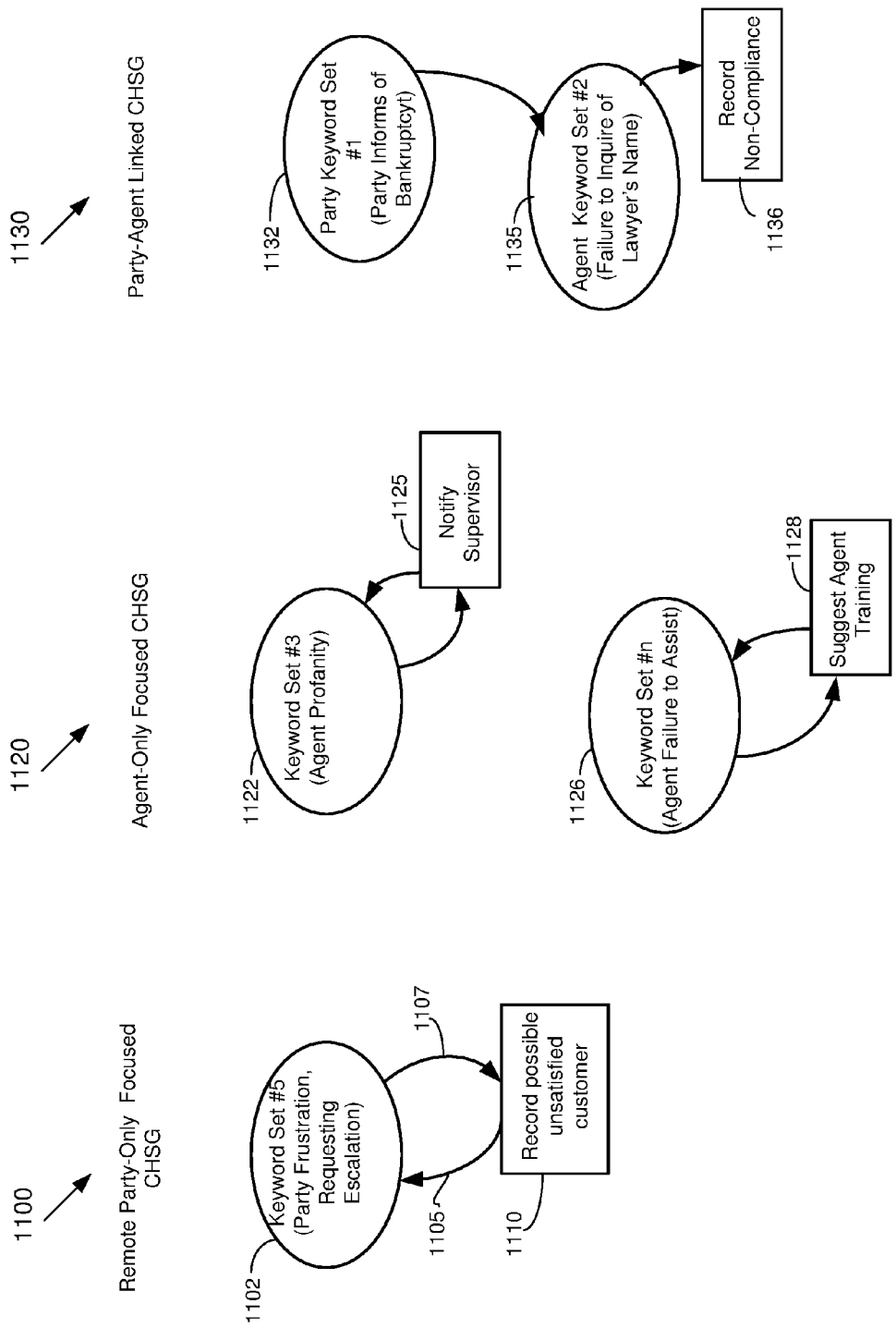
FIG. 11 illustrates various embodiments of how keyword sets can be used.

Thus, it is possible to have different levels of complexity of CHSGs. This is represented in FIG. 11, which is intended to illustrate the breadth of applications and the flexibility afforded by the present architecture. Turning to FIG. 11 and the first CHSG 1100, this focuses on analyzing the party's speech using a specified keyword set. The keyword set 1102 includes words that may indicate an unsatisfied customer. Upon detection of a keyword, arrow 1107 indicates that an action is taken. The action 1110 is to record a potential unsatisfied customer. Upon reporting that action, arrow 1105 returns to monitoring the keyword set.

This CHSG example 1100 may be the only CHSG executing on calls for a particular campaign. The CHSG 1100 only monitors the called party and records a possible unsatisfied customer. That is, upon detection of a keyword, the process returns to continue monitoring. The data collected could be used for identifying agents requiring additional training.

Another example 1120 involves two CHSGs, both of which are focused only on only monitoring the agent. These may be running in parallel, but independently. Here, there are two word sets 1122 and 1126. The keyword set #3 1122 is used to monitor for agent profanities. If a profanity word is detected, then the action 1125 is to notify the supervisor. Separately executing is another keyword set 1126 which monitors the agent for failure to assist. Thus, for example, phrases such as "I don't know" or "can't help" may be indicative of the agent not knowing the product details. The resulting action may be to record data indicating the agent requires product training 1128. These two keyword sets 1122 and 1126 may operate independently. That is, matching a keyword from one set is not predicated on any matching from the other set.

The third example 1130 illustrates two word sets 1132, 1135 which are linked. This corresponds to the bankruptcy context described above. Specifically, one keyword set 1132 is used to monitor the called party's speech and if a keyword is detected, then another keyword set 1135 is applied to the agent's speech. Specifically, if the called party has informed the agent of bankruptcy, then a keyword from the party keyword set #1 1132 is detected. This, in turn, causes the keyword set #2 1135 to be applied, which may result in recording an instance of non-compliance by the agent. Note that if a keyword from the party keyword set 1132 is never detected, then the agent keyword set 1135 is not applied. Thus, these keyword sets are dependent and cannot operate independently. It is possible to structure the CHSG for the bankruptcy example as two independent keyword sets which independently report events. If so, then appropriate logic in the call handler must process the event notifications to detect the desired condition and implement the appropriate linking.

In one embodiment, the different levels of complexity of the CHSG is largely reflected in the call processing logic script executing in the call handler. The functions of the control logic script in the speech analytics component is largely the same—to monitor a party's speech and report the detection of a keyword. Thus, the speech analytics component may be, in some embodiments, largely isolated with respect to complexity of the call processing.

Graphical User Interface for Defining a CHSG

Defining a CHSG for handling a particular compliance context can be facilitated by an administrator using a graphical user interface ("GUI"). This can be provided by a module that executes in the speech analytics component, the call handler, or both. In some embodiments, a portion of the information sets may be exported from one component to another. For example, if the CHSG is defined in the call handler, then the keyword sets and the speech analytics control logic must be loaded onto the speech analytics component. If the CHSG is defined in the speech analytics component, then the call processing logic script needs to be exported to the call handler. Separate modules may execute on the call handler and the speech analytics allowing defining the appropriate modules, such that no exporting is required.

Figure 12:
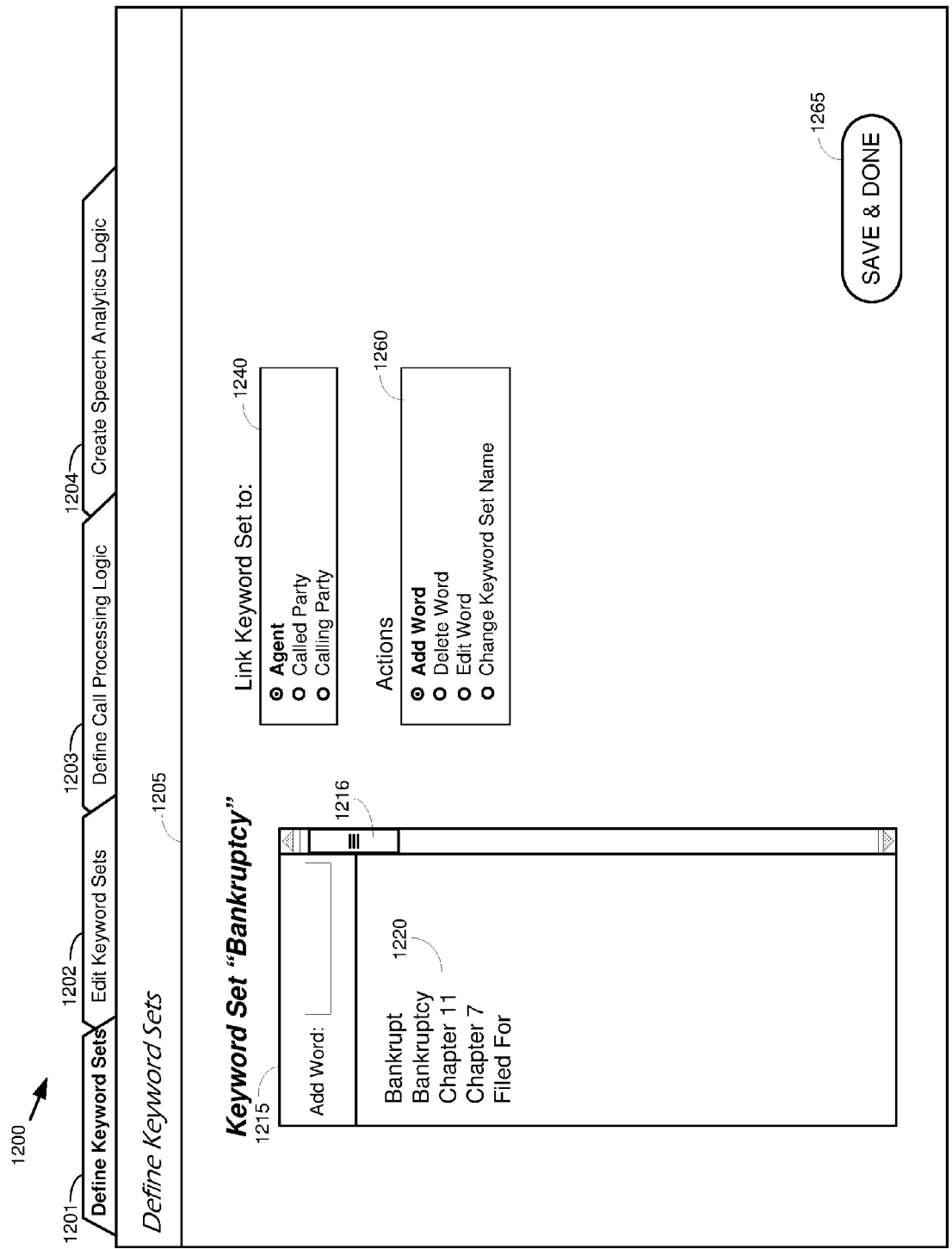
FIGS. 12-14 illustrate various embodiments of a graphical user interface used in one embodiment for configuration a system for facilitating agent compliance in a contact center.

One GUI example is shown in FIG. 12. In this screen 1200, various tabs for functions 1201-1204 are shown. The selected tab 1201 provides a window 1205 for defining a keyword set. In one embodiment, the words in a keyword set 1215 are listed individually 1220. Adding a word may be accomplished by typing in a word, selecting a keyword from an available vocabulary, or selecting a set of phonemes associated with the word.

A function box 1240 may be defined to allow the user to link the keyword set with the agent, called party or the calling party as appropriate. Another function box 1260 may allow functions to be performed on the keywords in the current keyword set. For example, functions may include adding a new word, deleting a word, editing a word, or changing the name of the keyword set. Once all the changes to the keyword set are defined, the changes can be saved by selecting a save icon 1265.

Figure 13:
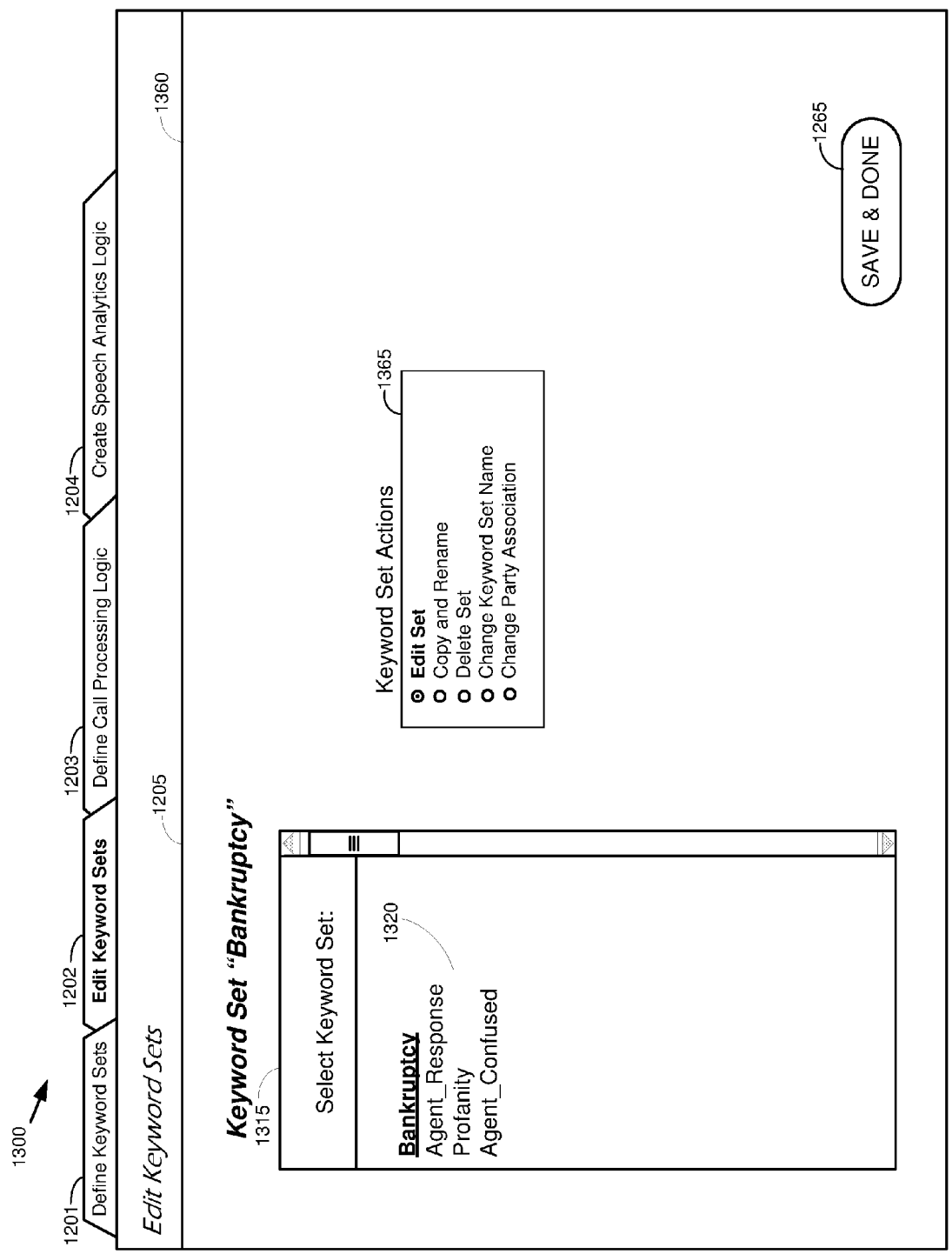

Turning to FIG. 13, another screen 1300 can be shown that is associated with the edit keyword set function tab 1202. In this case, a window 1315 showing the list of keywords 1320 is provided, with a function box 1365 indicating functions that may be applied to the keyword set, including: editing the contents of the keyword set, copying and renaming a keyword set, deleting a set, changing the name, or changing the association of the set with a particular party.

Figure 14:
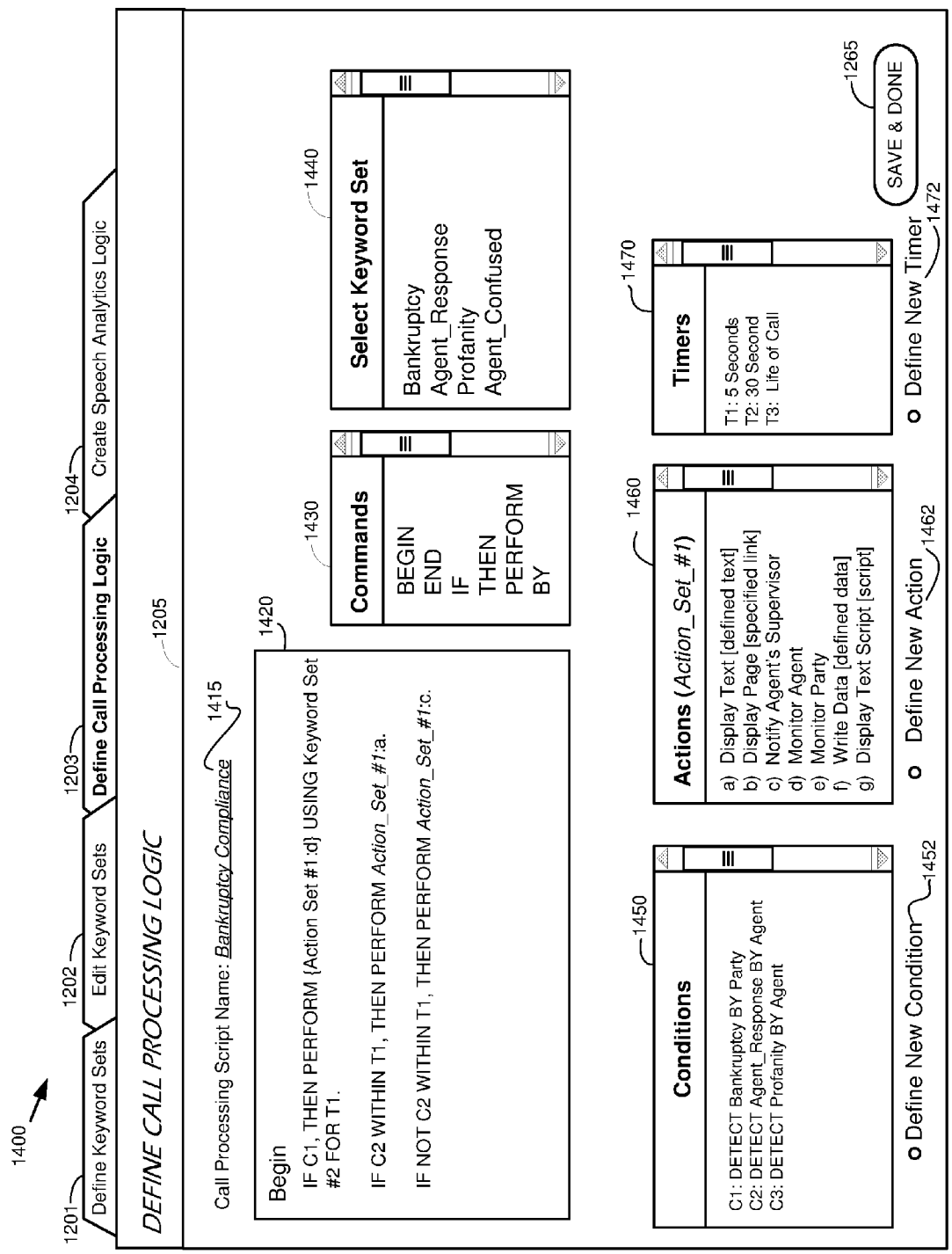

Finally, FIG. 14 shows one screen 1400 associated with the define call processing logic function tab 1203, that provides a window 1205 that allows the user to define the call processing logic. The call processing logic is associated with a script name 1415, so that different CHSGs may be defined. In this example, the CHSG being defined is called the "Bankruptcy Compliance" handler.

Several windows are presented, including a script window 1420, a command window 1430, a select keyword set window 1440, a conditions window 1450, an action window 1460, and a timer window 1470. Appropriate icons 1452, 1462, and 1472 are provided for editing or defining new elements in certain windows and an icon 1265 is provided for saving.

In other embodiments, a wizard or other forms of GUI interfaces may be used to allow the user to create the various data sets required to be defined in the call processing and speech analytic components. This can ensure that the syntax and semantics of the logic script conforms to the defined requirements.

Variations on the Embodiments
Multiple Call Handlers/Speech Analytic Components

The embodiments discussed above presume that there is a single speech analytics component and a single call handler in the form of a dialer. In other embodiments, there may be a plurality of speech analytics components and call handlers. For example, a call center may have separate call handlers for incoming calls (e.g., an ACD) and for outgoing calls (dialer). Both may bridge calls to a single speech analytics component, which analyzes speech on a call leg for a particular campaign. The speech analytics component may be remote located, and operated as a service bureau. Alternative embodiments may involve a single dialer that establishes call legs to a pool of speech analytics components, which provide a load-sharing and redundancy capability.

In another embodiment, there may be multiple call handler processing logic scripts that operate in coordination to process an event notification from a speech analytics component. For example, returning to FIG. 3, the call handler 304 may implement a portion of the call processing logic script that receives the event notification, and determines the applicable call campaign and agent. The call handler then forwards the event notification to the appropriate agent's workstation computer 160, which then has a call processing logic script executing that processes the event notification. This may be based on each call campaign having a unique call processing logic script that is loaded into the agent's computer when they log in and start to receive calls. The call handler 304 functions to route the event notifications to the appropriate agent's computer as necessary.

Agent Desktop Alerts

The actions that may be performed by the call processing logic script may include actions that result in information being displayed on the agent's computer. These types of actions may be considered as "alerts" because they inform the agent. As mentioned previously, alerts can result in presenting text to the agent's screen or presenting icons for selecting pre-recorded scripts. In addition, certain actions that are not primarily classified as an alert, may also result in another action performed, namely alert presented to the agent. For example, the action of bridging on the agent's supervisor does not by itself involve informing the agent of the condition, but it may be appropriate to define the bridging action as also presenting an icon to the agent informing them of this situation. Other embodiments may simply display an icon representing a particular context. For example, detection of a profanity word may result in presenting an icon to the agent representing "no swearing." Thus, displaying icons may be associated with a severity level of an action.

Other alerts may be presented to the agent based on their handling of a context. These alerts may not be explicitly defined as an action in the call processing logic script, but are defined to be presented to the agent based on various conditions. For example, returning to the debt-collection example, each such call has the potential of the called party informing the agent that they have declared bankruptcy. Therefore, there is the potential for each call for the agent to handle in compliance with a policy or in non-compliance with the policy. A visual indicator can be presented to the agent indicating how they are performing with respect to conforming to policies. For example, the compliance indicator could be an icon of an arrow that is initially pointed horizontally. If the agent is determined to have conformed to a policy, then the arrow is positioned to point up. If the agent is determined to have not confirmed to the policy, the arrow could point down. This provides a continuous feedback indicator to the agent as to their performance.

In other embodiments, a miniature stop light-like icon could change colors to indicate compliance. In other embodiments, a numerical or letter score could be presented to the agent for each call. Thus, the agent receives a real-time trend indicator or a real-time call outcome score that provides feedback to the agent as to how they are performing. Further, the agent may be able to select the icon and receive further detailed information regarding which compliance policies were determined to be non-complied with, allowing the agent to investigate, and potentially learn from such instances. Further, functionality may be provided where the user can flag that instance for dispute, as there may have been an incorrect assessment by the system.

Other alerts may be presented to the agent on their desktop screen that merely informs the agent that real-time compliance testing is active. Merely informing the agent that such compliance testing is being performed may remind the agent to properly conform in various contexts. The administrator may have the control to activate/deactivate this on a per-agent station basis.

In other embodiments, the agent could be presented with a real-time cumulative compliance score. Compliance could result in call compliance points being added to the agent's compliance file, whereas non-compliance could result in points being subtracted. This allows the severity of compliance/non-compliance to be tracked and presented to the agent. The accumulation of points could further be stored in a compliance file and associated with the agent. Further, information about the context in which the points were accumulated may be recorded. The agent compliance file could be used in evaluating the agent's performance for a defined evaluation timeframe or all calls associated with a particular campaign. This compliance file could be used to determine if the agent should be trained, for what topics, receive a bonus, or increase their performance rating, etc.

In addition, calls may be recorded, retained, and retrieved on the basis of certain context occurring. This allows the recorded calls to be used as a training tool. For example, returning to the debt-collection example, if the agent fails to respond to the initial warning after the called party informs the agent of bankruptcy, the call may be recorded. If the agent fails to respond after the second time of being warned, the recording may be indexed as an example of an extreme failure to comply, and may be retrieved and played to other agents as a training tool. Alternatively, the recording may be reviewed between the agent and their supervisor for evaluation purposes. If an agent disputes a recordation of a compliance violation, these calls could then be reviewed to verify that the compliance violation was correctly ascertained.

Reporting

Information may be generated for each agent and for each call that provide a call-by-call evaluation of the agent's compliance to policies, as well as an overall compliance. This data can be collected for all agents in a shift, in the call center, or working on a particular campaign. The call handler may maintain such information in a database, such as the data store 175 of FIG. 1, which can be compiled into reports, and used by the call center administrator. These reports may allow the administrator to review each agent's call compliance score for each call, their cumulative compliance score, major compliance violations, as well as average values relative to others. In addition, a real-time dashboard can be presented to the call center administrator that shows the current per call and cumulative compliance scores for each agent in a campaign. Such reports can be structured for a shift, defined time period, per campaign, per supervisor, per team, or any other such parameter as deemed appropriate.

Other Compliance Related Applications

The concepts and technologies disclosed above in conjunction with the compliance enforcement system are largely illustrated in regard to detection of a called party's bankruptcy filing for a debt collection call. Some other compliance related applications are provided, but it should be recognized that many other contexts can be defined for using the concepts and technologies disclosed herein.

In one embodiment, a called party may request to be placed on a do-not-call list. The agent may be expected to disposition the call in a certain manner, and confirm the number that is to be placed on the do-not-call list. The CES disclosed herein can detect if the called party requested to be placed in the do-not-call list, and if so, an application for adding the number to the do-not-call list can be opened on the agent's computer. Further, the CES can detect whether the agent confirmed the number to the remote party, and can warn the agent that confirmation is necessary. Finally, the CES can disposition the call with the appropriate code, assuming a code is defined for removing the number from all dialing lists.

In another embodiment involving debt collection, agents are required to provide a statement to the called party at the beginning of the call informing them about the purpose of the call. This is sometimes referred to as "mini-Miranda" in the art, since it carries various ramifications if it is not stated at the beginning of the call. The CES can monitor for each call of an agent as to whether the agent has properly stated the mini-Miranda statement at the beginning of each debt collection call.

In another embodiment, agents initiating telemarketing calls offering refinancing of mortgages must provide certain information regarding the products being offered. The CES again can monitor each agent to ensure that the appropriate and required product information is being offered, such as the effective interest rate and other terms.

In another embodiment, callers seeking customer service may provide a product type, model number, and serial number for repair. The CES can monitor for certain keywords (e.g., "printer" versus "computer") and present the agent with the appropriate information for troubleshooting the product. Further, appropriate pages from repair guides can be presented to the agent.

In another embodiment, the CES can detect when callers or agents are frustrated and present to the agent an option of conferencing a supervisor onto the call who can address unresolved issues. In an extreme case where the context dictates, the CES can mute the agent on the call, play a message to the called party ("Please hold while we connect you to a supervisor"), and then connect the party to a supervisor.

In another embodiment, agents can be identified for training, along with the subject to be trained. For example, assume that an agent providing product support is asked questions about printers and computers. In various instances, when asked by a caller about a printer model, the agent winds up frequently saying "I don't know" or "I will have to check." However, these phrases are rarely spoken by the agent when questions are asked about the computer. This suggests that the agent is knowledgeable of the computer products, but not with the printer products. By analyzing instances of when the agent indicated they do not know an answer to a question, deficiencies for that agent on a particular product can be identified. This can be ascertained by analyzing data written based on an action in the call processing logic script. The agent can then be scheduled for training on the appropriate product.

In another embodiment, the agent-remote party conversation can be analyzed to determine whether the remote party consented to recording the call. Assuming that the remote party provided consent, the call processing logic script can then invoke an action that activates call recording for the current call. The call processing logic script could also then deactivate it at the end of the call, or the call recording could otherwise be automatically deactivated at the end of the call. In other embodiments, call recording could be activated at the beginning of the call, and if the remote party does not authorize recording, then the call processing logic script could deactivate the call recording.

Division of Functionality Between the Call Handler and Speech Analytics Component In the previous discussion, it was explained how allocation of functions between the call handler and the speech analytics component impacts the protocol over the API and how the corresponding scripts are structured. In another embodiment, all the flexibility is provided by the call handler, and there is minimal flexibility provided by script logic in the speech analytics components.

In this embodiment, the functions performed in the speech analytics component are limited, and primarily relate to: 1) loading a keyword set to be applied for a subsequent call ("LOAD"), 2) applying a specified keyword set to a specified party's speech on a specified call ("APPLY"), 3) removing the application of a specified keyword set ("REMOVE"), and 4) reporting event notifications of a detected keyword by a party ("EVENT"). The API message is correspondingly limited to the call handler issuing commands to the speech analytics component to load a keyword set(s), apply a keyword set, and remove a keyword set. In one embodiment, there is no functionality in the speech analytics component to report if a party fails to state a word. Hence, there are no timers executing in the speech analytics component for this function.

This approach has a benefit of conserving processing resources in the speech analytics component. If a keyword set is not required to be used at a certain point in the call, the speech analytics component can be instructed to remove the application of the keyword set. Thus, the speech is not analyzed to detect the keywords in the keywords set. This can also save conserving processing resources in the call handler. For example, if a party's speech is no longer required to be monitored for a particular keyword, then the call handler will not receive any event notifications. If the speech analytics component continued to monitor the speech, and then reported an event notification, then the call handler would have to ignore the event notification if the context indicated that such was not relevant. Thus, if the event notification is not required, processing resources are saved on both the speech analytics component and the call handler.

Of course, some keyword sets may be required to be monitored throughout the call. For example, the profanity keyword set may be monitored throughout the call, since profanity may be uttered at any time, and any time it is uttered it should be detected. On the other hand, monitoring the agent for inquiry of a lawyer handling the remote party's bankruptcy is only applicable if the remote party has indicated they have filed for bankruptcy, which typically is at the beginning of the call. Further, once the party has indicated they filed for bankruptcy, and the agent has inquired as to their lawyer, there is no further need to continue to monitor the called party and the agent.

In many compliance related issues, the agent is expected to respond in a certain manner after the remote party has stated certain information. Thus, unnecessary processing for so-called linked keyword sets can be avoided by first waiting for the remote party to state certain information before monitoring the agent. Further, once the remote party has stated the information, there is no reason to continue monitoring the remote party. In many instances, each party may repeat words or phrases in a keyword set, which may result in extraneous event notifications sent by the speech analytics component. However, in many contexts there is not need to monitor the parties after a certain point in the call. Hence detection of keywords, reporting of keywords, and processing event notifications may not be required.

Figure 15:
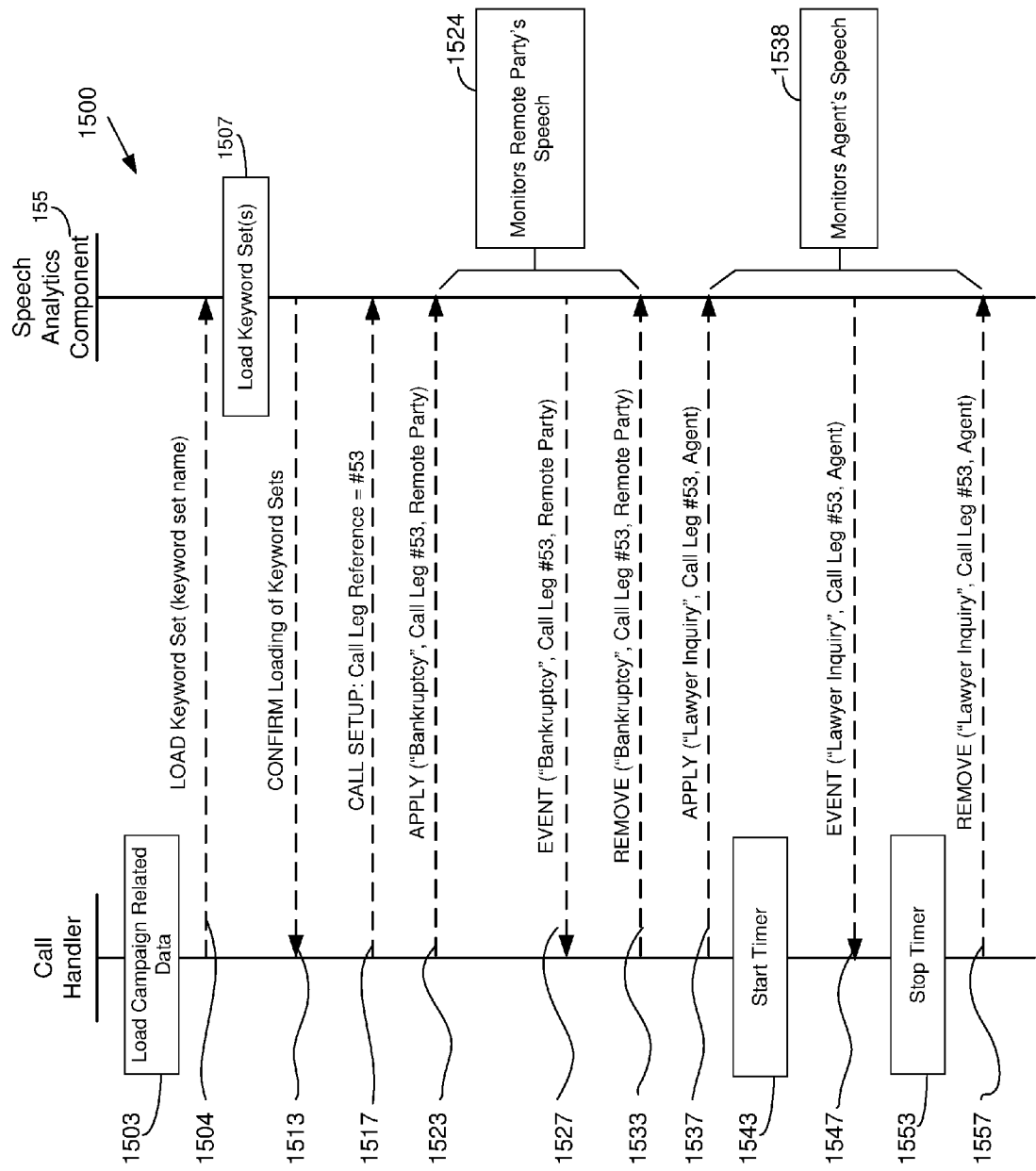
FIG. 15 illustrates a message flow between the call handler and the speech analytics component according to one embodiment of the invention.

This simplified architecture can be illustrated using a message flow diagram as shown in FIG. 15. The message flow 1500 illustrates the call handler in the form of a dialer 150 communicating with the speech analytics component 155. The process begins with the call handler loading campaign related data 1503 prior to handling any calls. This results in the call handler transmitting a message 1504 indicating which keyword sets will be required. This would include all keyword sets that are used for the call, including ones may be applied generally for the entire call, or keyword sets which are applied only based on the detection of a keyword from another keyword set.

In response, the speech analytics component loads the necessary keyword sets in operation 1507. A confirmation message 1513 may be sent back to the call handler.

Next, the call handler establishes a call leg in message 1517 with an identifier value. In this example, the call leg reference value is arbitrarily set to #53. Next, the call handler sends an APPLY command, instructing the speech analytics component to apply a keyword set (in this case, the "bankruptcy" keyword set), for a particular call (call leg #53), and for a particular party (the remote party).

At this point the speech analytics component begins to monitor the remote party's speech in operation 1524. When a keyword is detected, an EVENT message 1527 is reported. Monitoring continues until the call handler sends a REMOVE command in message 1533 indicating that the keyword set no longer needs to be applied to the remote party.

Next, the call handler instructs the speech analytics component to APPLY the "lawyer inquiry" keyword set to the same call, but for monitoring the agent's speech via message 1537. Thus, the speech analytics component no longer is monitoring the remote party's speech, but the agent's speech. This message triggers operation 1538 of monitoring the agent's speech. The call handler also starts a time in operation 1543, since if the agent does not respond properly within a timeframe, the agent may be presumed to have been in non-conformance.

Assuming the agent does respond properly, an EVENT message 1547 is returned when the agent inquires of the lawyer handing the bankruptcy. In response, the call handler terminates the timer in operation 1553. The call handler may then send an REMOVE message 1557 to indicate that the agent should no longer be monitored.

In this example, once the remote party indicates bankruptcy and the agent inquires of their lawyer, there is no further need to detect and report events to the call handler of the remote party stating certain keywords, and the agent stating other certain keywords. This frees up resources in the speech analytics components, and avoids the call handler from having to field and ignore EVENT messages.

In this example, the speech analytics component control logic script could effectively become a command parses that acts upon the LOAD, APPY, and REMOVE messages. In other embodiments, other variations of the functions may be allocated differently, and greater autonomous control may be defined in the speech analytics component.

Exemplary Call Processing Logic Script Structure

Based on the above, a call processing logic script language can be defined. Such exemplary scripting language could augment or modify the previously provided examples. The script logic commands that can be defined include:

APPLY {keyword set} TO {calls, party}—directs the speech analytics component to apply the indicated keyword set for a particular set of calls, campaigns, or as otherwise indicated for the indicated party (e.g., agent or remote party).

REMOVE {keyword set} FROM {calls, party}—directs the speech analytics component to cease applying the indicated keyword set as indicated.

PERFORM {action}—directs execution of the action as indicated. The action may be one of the aforementioned actions, or as otherwise defined.

LOAD {keyword set}—directs the speech analytics component to retrieve the keyword set(s) for use in future APPLY commands. This allows the speech analytics component to 'get ready' to use the keyword set by loading it into memory.

START/STOP/BEFORE_EXPIRY/AFTER_EXPIRY {timer}—These commands (separated by a "/") respectively cause the timer to be started, stopped in the call processing logic script. These may also implicate a condition while the timer is running, e.g., before it expires, or after the timer expires.

The main logic command may be structured as an "IF . . . THEN . . . ELSE" type of command, which is referred to herein as a "conditional logic command." In many embodiments, the format structure may simply be a "IF . . . THEN" format without an ELSE command (e.g., the ELSE is optional). The "IF" portion pertains to whether the indicated condition is true. In many instances, the condition is whether an event is received. It is clear now that the event notifications being acted upon in the call processing logic script must correspond to the same events that are being detected in the speech analytics component. If the test is for the event being false (e.g., an event has not been received), then the conditional logic command may be structured as "IF NOT {event}" Below are some common example scripting structures and what they indicate.

a. IF {event} THEN PERFORM {action}. If the indicated event is reported from the speech analytics component, then the indicated action is performed. This structure could be used to continuously monitor events, e.g., the agent's speech for a certain keyword such as profanity, or to continuously monitor the remote party's speech for a keyword such as "bankruptcy."

b. IF {event} BEFORE_EXPIRY {timer} THEN PERFORM {action} ELSE REMOVE {keyword set} FROM {calls, party}. This indicates that if the indicated event is reported before the indicated timer expires, then the indicated action is performed; otherwise, the indicated keyword set is no longer applied for the indicated calls and indicated party. This could be used to monitor the remote party's speech for the word "bankruptcy" within the first 3 minutes of a debt collection call, and if it is not detected by that point, the speech analytics component is told to no longer monitor the remote party's speech for that keyword.

c. IF {event} THEN START {timer}. If a particular event is reported, such as the remote party speaking the word "bankruptcy", then the indicated timer could be started.

d. IF {event} THEN APPLY {keyword set} TO {call, party}. If a particular event is reported, then the speech analytics component is directed to apply the indicated keyword set for monitoring the speech of the indicated party and call. For example, once the remote party states they are in bankruptcy, the speech analytics component could be told to start analyzing the agent's speech using the indicated keyword set.

e. IF {event} BEFORE_EXPIRY {timer} THEN REMOVE {keyword set} FROM {calls, party}. This indicates that if an event is received while the indicated timer is running, then the indicated keyword set can be removed, e.g., no longer applied for analyzing the indicated party's speech on an indicated call. For example, assume that once an event is received indicating a party reports bankruptcy, the timer is started. Then, if the agent states a certain word before the timer expires, then the keyword set can be removed—e.g., the agent's speech no longer has to be analyzed. This saves processing resources in the speech analytics component.

f. IF {event} BEFORE_EXPIRY {timer} THEN PERFORM {action}. This indicates that if a particular event is reported as occurring before a timer expires, then the indicated action is reported. For example, if the agent responds with asking for the remote party's lawyer, and this event is reported before the indicated timer expires, then an indicated can be written to the file that the agent responded properly. However, to handle the situation where the agent did not respond within the time period, the following command could have been used: IF NOT {event} BEFORE_EXPIRY {timer} THEN PERFORM {action}. The action would be, e.g., notifying the supervisor of a violation.

One skilled in the art can augment this scripting language can be augmented in various ways, including allowing nested IF-THEN-ELSE statements, commands to define timer values, other conditional logic statements, associating values to campaigns, etc.

Exemplary Processing Device Architecture

Figure 16:
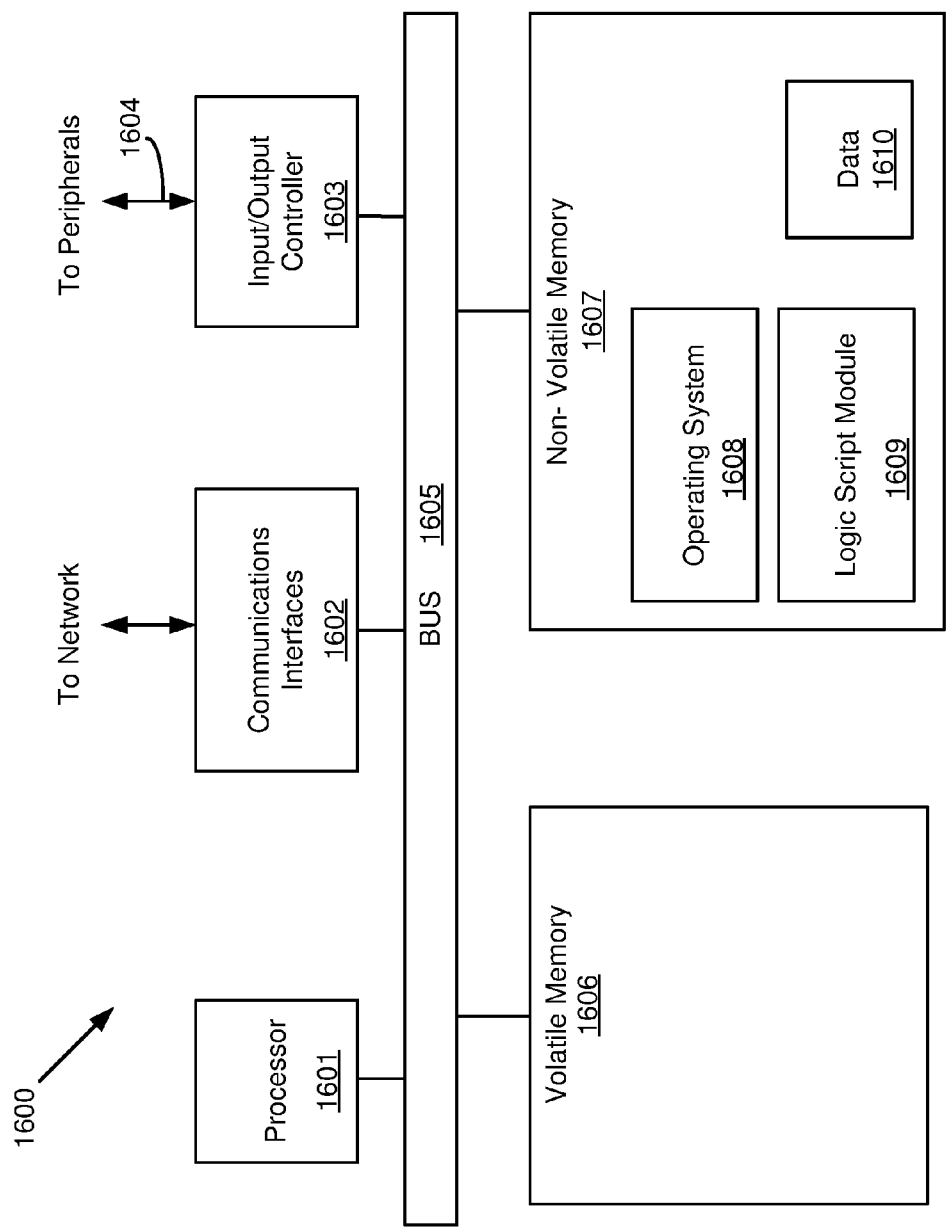
FIG. 16 illustrates one embodiment of a computing processing architecture used in various embodiments providing the concepts and technologies disclosed herein.

FIG. 16 is an exemplary schematic diagram of a processing system 1600 that may be used in an embodiment to practice the technologies disclosed herein, such as the call handler 304 or speech analytics component 155. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 16, the processing system 1600 may include one or more processors 1601 that may communicate with other elements within the processing system 1600 via a bus 1605. The processor 1601 may be implemented as one or more complex programmable logic devices ("CPLD"), conventional microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, integrated circuit processors, other circuitry, or the like.

In one embodiment, the processing system 1600 may also include one or more communications interfaces 1602 for communicating data via the local network with various external devices. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1603 may also communicate with one or more input devices or peripherals using an interface 1604, such as, but not limited to: a keyboard, a mouse, a touch screen/display input, microphone, pointing device, etc. The input/output controller 1603 may also communicate with output devices or peripherals, such as displays, printers, speakers, headsets, banner displays, etc.

The processor 1601 may be configured to execute instructions stored in volatile memory 1606, non-volatile memory 1607, or other forms of non-transitory computer-readable storage media accessible to the processor 1601. The volatile memory 1606 may comprise various types of memory technologies, including, but not limited to: random access memory ("RAM"), dynamic random access memory ("DRAM"), static random access memory ("SRAM"), and other forms well known to those skilled in the art. The non-volatile memory 1607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1607 may store program code and data, which also may be loaded into the volatile memory 1606 at execution time. Specifically, the non-volatile memory 1607 may store one or more computer program modules, such as a logic script module 1609 containing instructions for performing the process and/or functions associated with the technologies disclosed herein, and related data 1610 such as keyword sets, and/or operating system code 1608. In addition, the logic script module 1609 may generate or access the data 1610 in the non-volatile memory 1607, as well as in the volatile memory 1606. The volatile memory 1606 and/or non-volatile memory 1607 may be used to store other information including, but not limited to: records, applications, programs, scripts, source code, object code, byte code, compiled code, interpreted code, machine code, executable instructions, or the like. The volatile memory 1606 may include keyword sets, action sets, and other related data to implement the concepts and technologies disclosed herein. These instructions may be executed or processed by, for example, the processor 1601. These may form a part of, or may interact with, the logic script module 1609 and/or data 1610.

The technologies described herein may be implemented in various ways, including as computer program products comprising memory storing instructions causing a processor to perform the operations associated with the above technologies. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for monitoring compliance by an agent of a contact center on a call to a remote party comprising:
   a processor configured to:
     receive a first event notification from a speech analytics component indicating detection of a first keyword from a first keyword set in speech associated with the call from the remote party;
     start a timer after receipt of the first event notification;
     receive a second event notification from the speech analytics component after receiving the first event notification, the second event notification indicating detection of a second keyword from a second keyword set in speech associated with the call from the agent; and
     perform an action in response to determining the second event notification is not received prior to expiry of the timer, wherein the action comprises displaying a visual indication on a display of a computer terminal used by the agent informing the agent of a non-compliant response.

2. The system of claim 1, wherein the processor is further configured to:
   receive a third event notification from the speech analytics component indicating detection of a third keyword from the second keyword set in speech from the agent, wherein the third event notification is received after expiry of the timer.

3. The system of claim 2, wherein a second timer is started after the expiry of the timer, and the processor is further configured to stop the second timer upon receipt of the third event notification.

4. The system of claim 1, wherein the action comprises recording an indication of non-compliance in a compliance file associated with the agent.

5. The system of claim 4, wherein the action further comprises recording at least a portion of audio of the call.

6. The system of claim 1, wherein the visual indication is an icon.

7. The system of claim 6, wherein the processor is further configured to:
present text-based information regarding a compliance policy in response to the agent selecting the icon.

8. The system of claim 1, wherein the first keyword is associated with the remote party requesting a telephone number associated with the remote party be placed in a do-not-call database.

9. The system of claim 8, wherein the visual indication comprises text instructing the agent to confirm the telephone number associated with the remote party.

10. The system of claim 1, wherein the processor is further configured to:
update an agent compliance score based on failure to receive the second event notification prior to expiry of the timer.

11. The system of claim 10, wherein the processor is further configured to:
cause the agent compliance score to be displayed on the display of the computer terminal used by the agent.

12. The system of claim 1, wherein the first keyword set reflects indication of a reassigned telephone number and the action further comprises prompting the agent to disposition the reassigned telephone number as a reassigned number.

13. The system of claim 1, wherein the first keyword set is a group comprising "do", "not", and "call", and the visual indication comprises text telling the agent to confirm a telephone number associated with the remote party.

14. A computer-readable non-transitory medium storing instructions that when executed by an integrated circuit microprocessor in a call handler, cause the microprocessor to:
process a first event notification received from a speech analytics component, the first event notification signifying detection by the speech analytics component of a first keyword from a first keyword set in speech uttered by a remote party during a conversation with an agent on a call in a call center;
start a timer after receiving the first event notification;
determine the timer has expired;
determine a second event notification from the speech analytics component is not received prior to the timer having expired, wherein the second event notification signifies detection of a second keyword from a second keyword set in speech uttered by the agent; and
cause a visual indicator to be displayed on a screen of a computer used by the agent in response to expiry of the timer, the visual indicator representing a compliance status of the agent for the call.

15. The computer-readable non-transitory medium of claim 14, wherein the visual indicator is an icon and the instructions further cause the microprocessor to:
present information to the agent on the screen of the computer regarding a compliance policy in response to the agent selecting the icon.

16. The computer-readable non-transitory medium of claim 14, wherein the visual indicator is an icon and the instructions further cause the microprocessor to:
start a second timer in conjunction with causing the visual indicator to be displayed on the screen; and
cause the icon to be removed from the screen upon expiry of the second timer.

17. The computer-readable non-transitory medium of claim 14, wherein the first keyword is associated with the remote party requesting inclusion of a telephone number on a do-not-call list and the visual indicator instructs the agent to verbally confirm the telephone number with the remote party.

18. The computer-readable non-transitory medium of claim 14, wherein the visual indicator is an icon and the instructions further cause the microprocessor to:
display text-based information regarding the compliance status in response to the agent selecting the icon.

19. The computer-readable non-transitory medium of claim 14, wherein the instructions further cause the microprocessor to:
update an agent compliance score based on failure to receive the second event notification prior to expiry of the timer.

20. The computer-readable non-transitory medium of claim 19, wherein the instructions further cause the microprocessor to:
display the agent compliance score on the screen of the computer used by the agent.

* * * * *